Aug. 4, 1936.　　　E. G. BRIDGES　　　2,049,422
METHOD AND APPARATUS FOR THE MANUFACTURE OF HOLLOW GLASSWARE
Filed Feb. 4, 1931　　　13 Sheets-Sheet 1

Inventor
Edward G. Bridges,
By Emery, Booth, Varney Holcomb
his Attorneys

Aug. 4, 1936.  E. G. BRIDGES  2,049,422
METHOD AND APPARATUS FOR THE MANUFACTURE OF HOLLOW GLASSWARE
Filed Feb. 4, 1931  13 Sheets-Sheet 3

Inventor
Edward G. Bridges.
By Emery, Booth, Varney & Holcombe
His Attorneys

Aug. 4, 1936.  E. G. BRIDGES  2,049,422
METHOD AND APPARATUS FOR THE MANUFACTURE OF HOLLOW GLASSWARE
Filed Feb. 4, 1931   13 Sheets—Sheet 4

Fig. 4ª

Inventor
Edward G. Bridges.
By Emery, Booth, Varney & Holcombe
His Attorneys

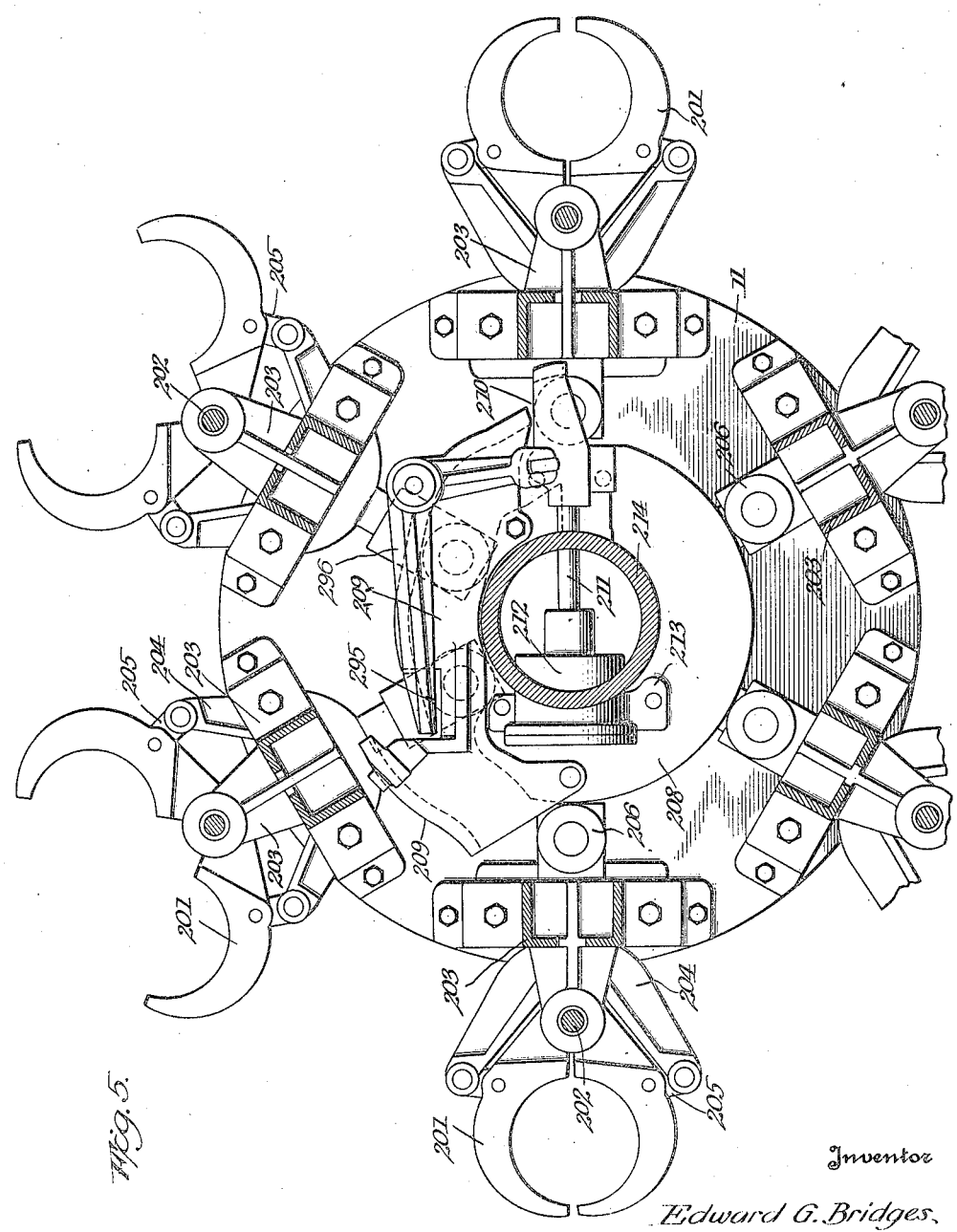

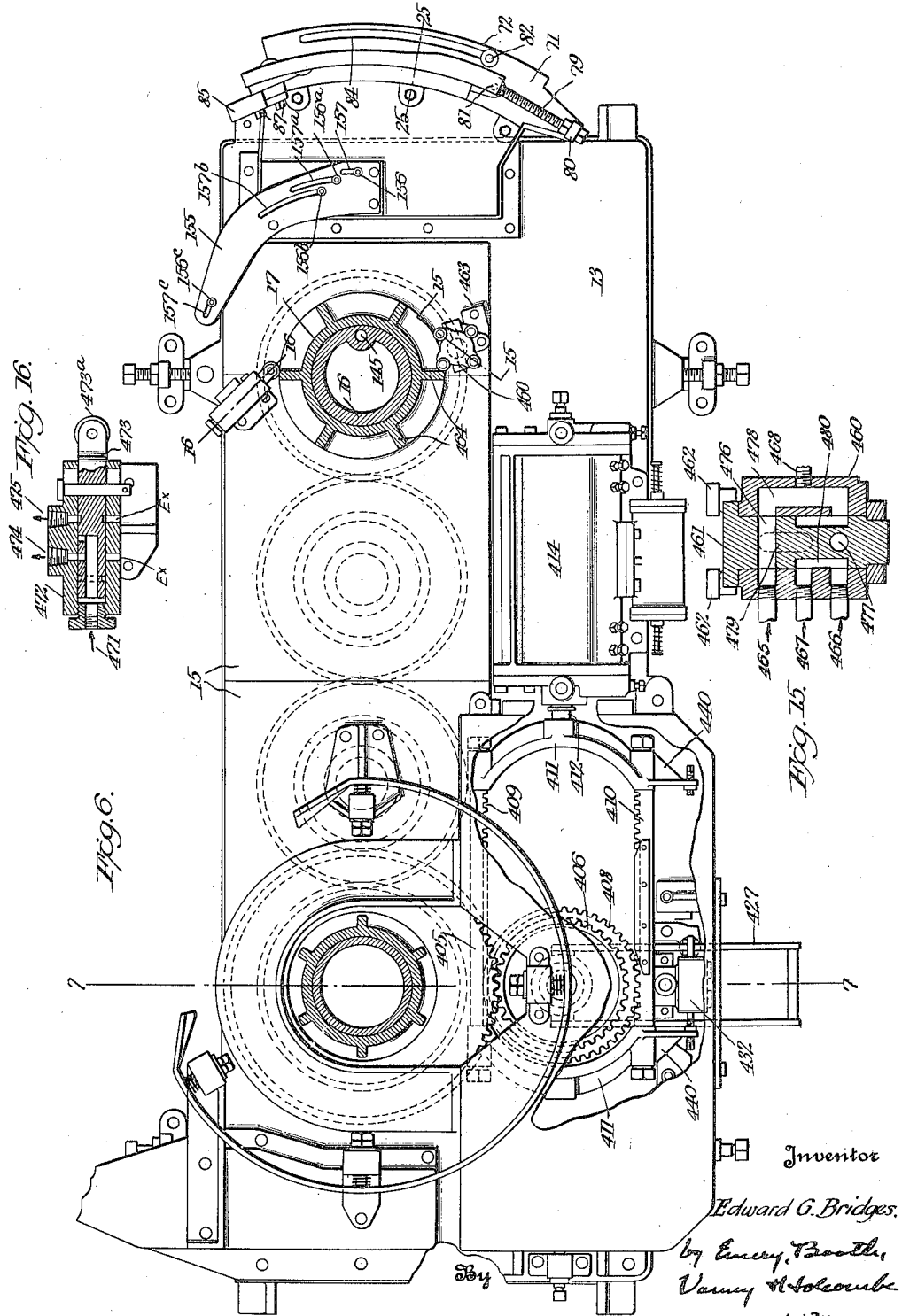

Aug. 4, 1936.    E. G. BRIDGES    2,049,422
METHOD AND APPARATUS FOR THE MANUFACTURE OF HOLLOW GLASSWARE
Filed Feb. 4, 1931    13 Sheets-Sheet 7
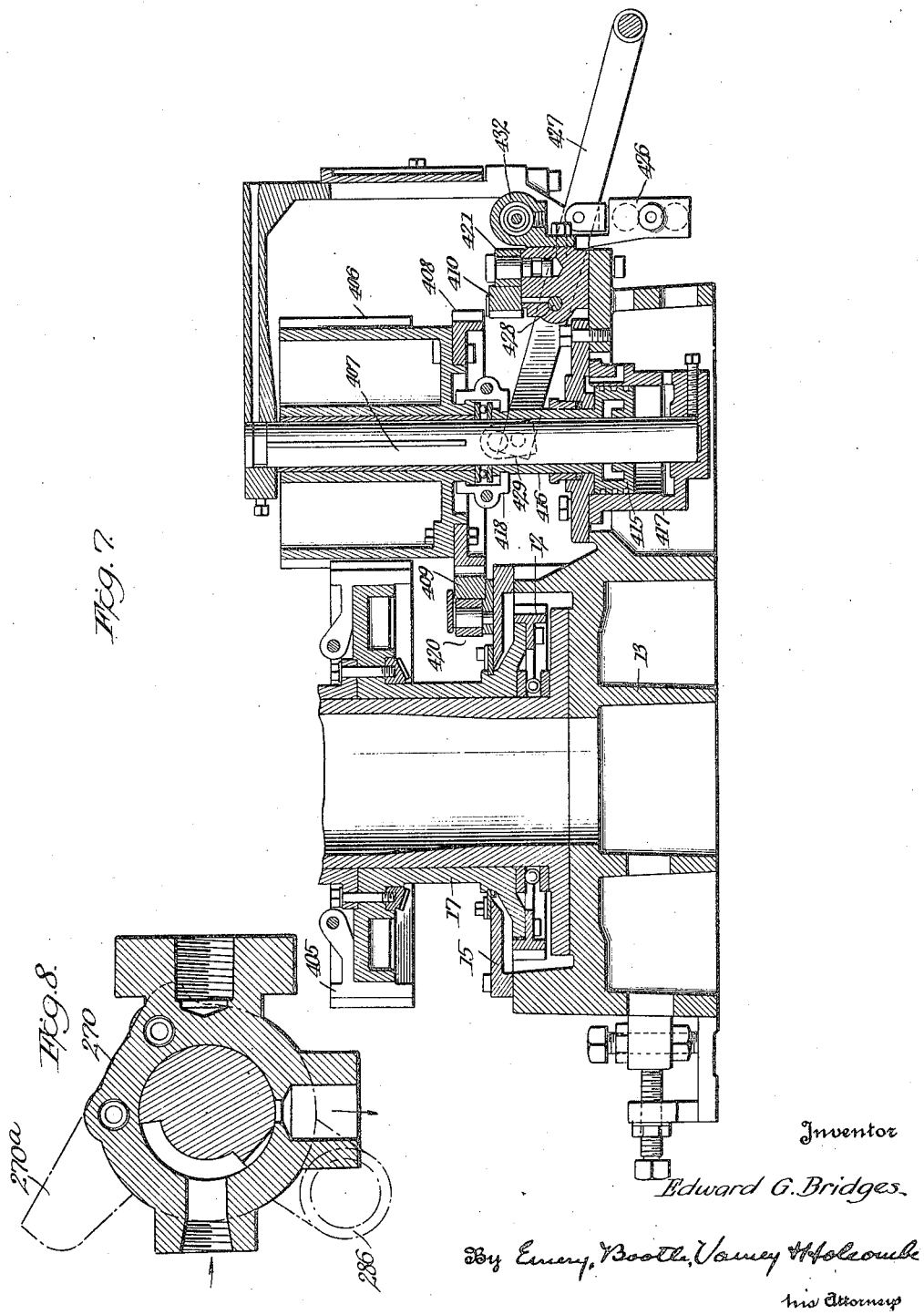
Inventor
Edward G. Bridges
By Emery, Booth, Varney & Holcombe
his Attorneys

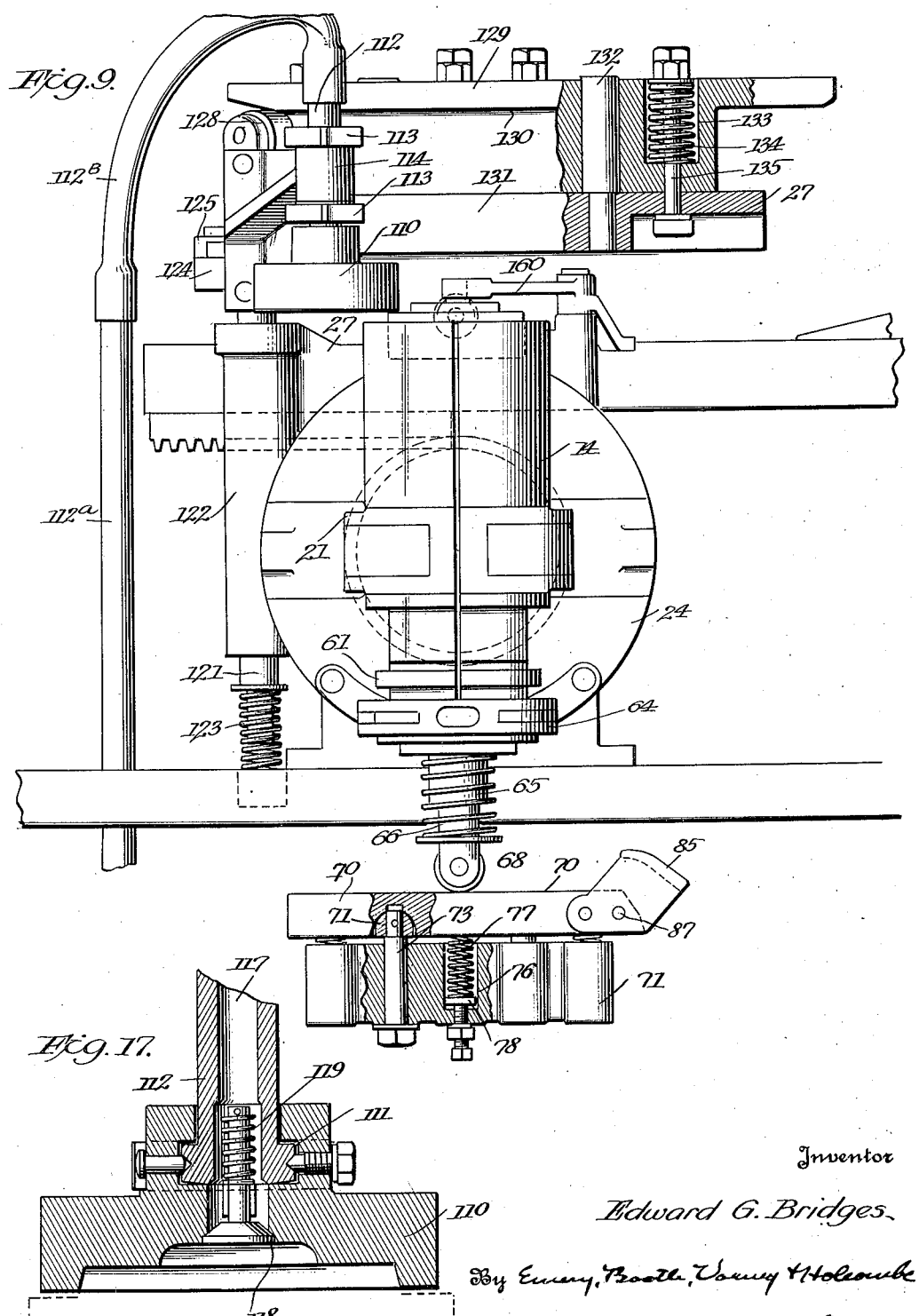

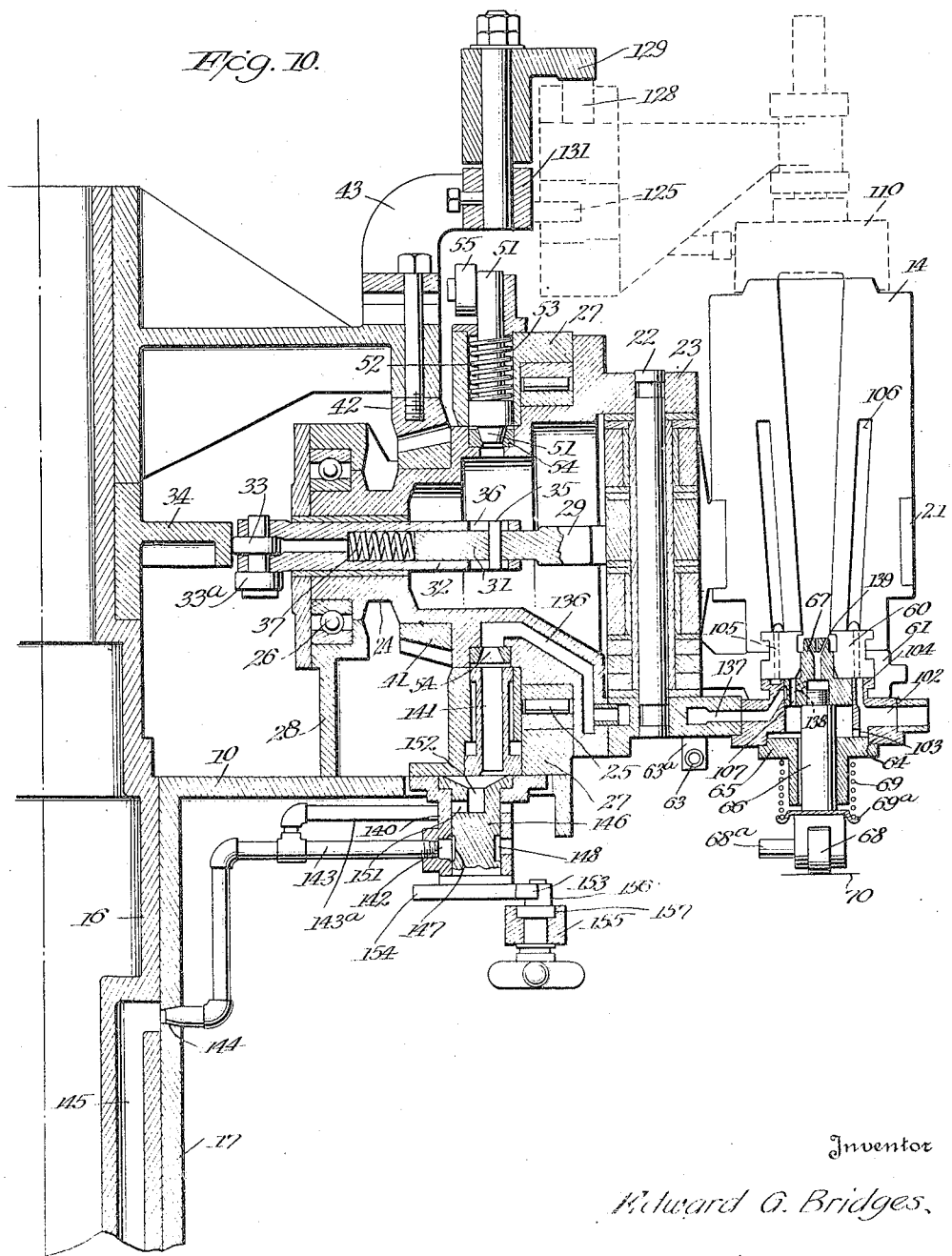

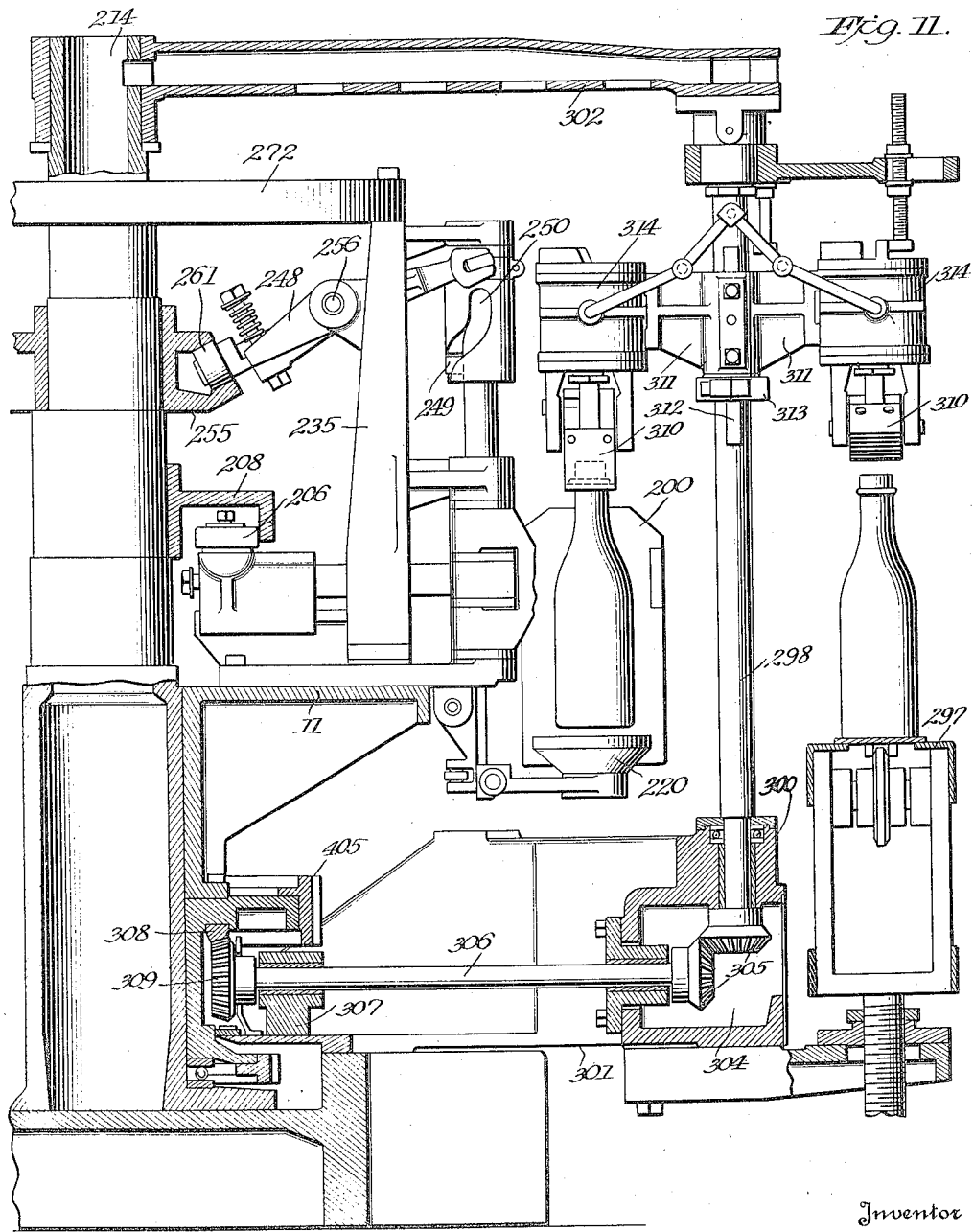

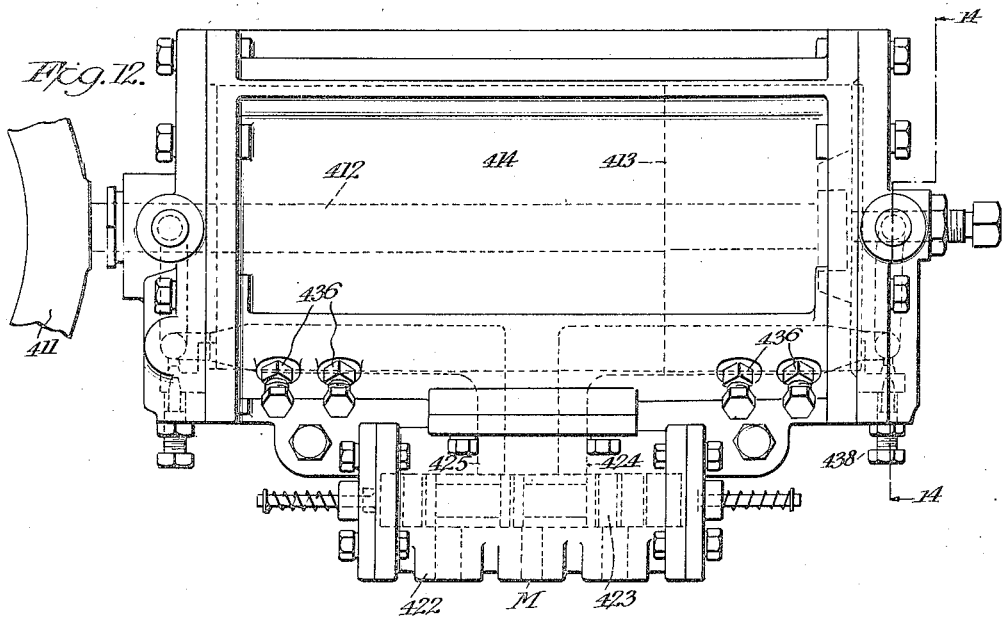
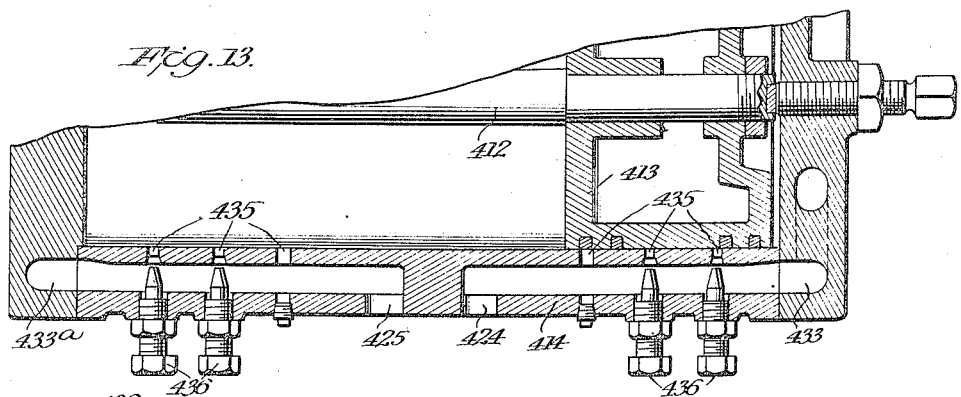
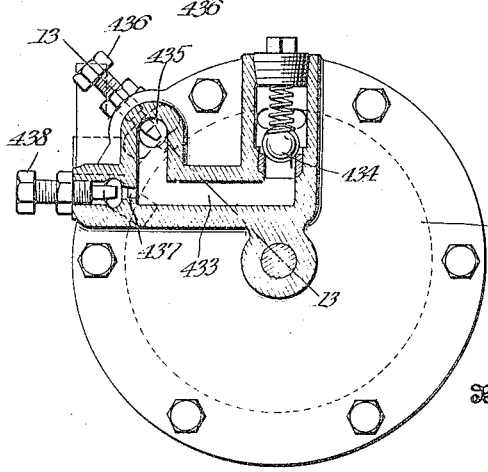

Aug. 4, 1936.  E. G. BRIDGES  2,049,422
METHOD AND APPARATUS FOR THE MANUFACTURE OF HOLLOW GLASSWARE
Filed Feb. 4, 1931  13 Sheets-Sheet 12
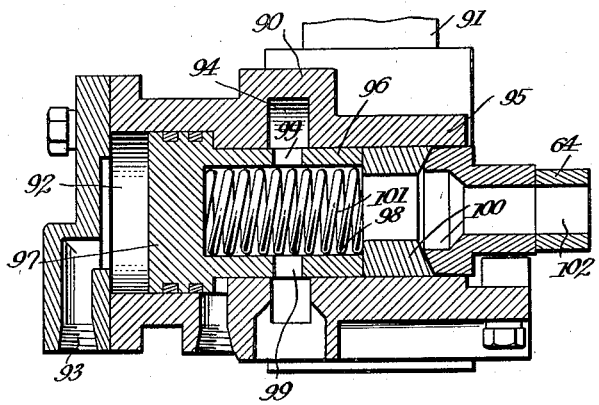
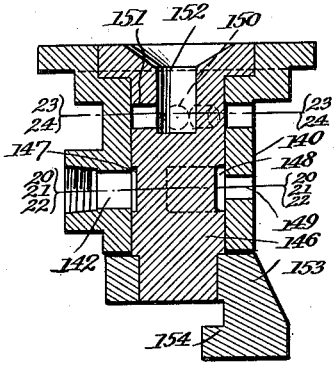
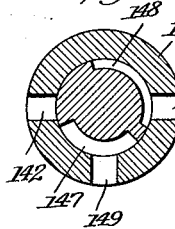
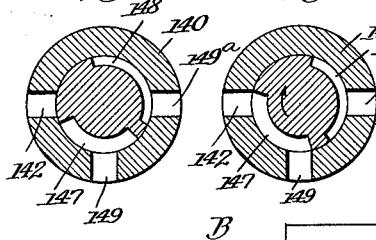
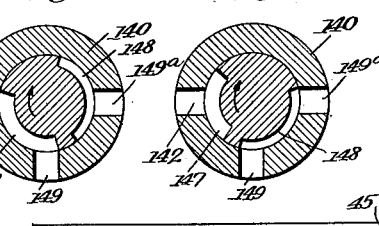
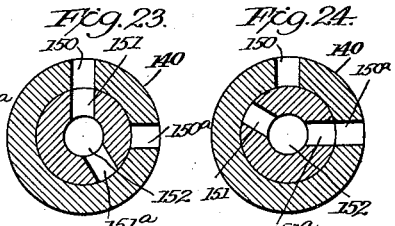
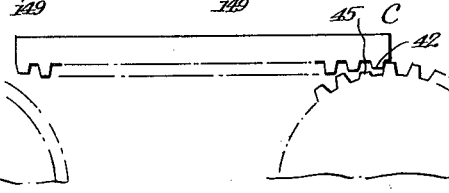
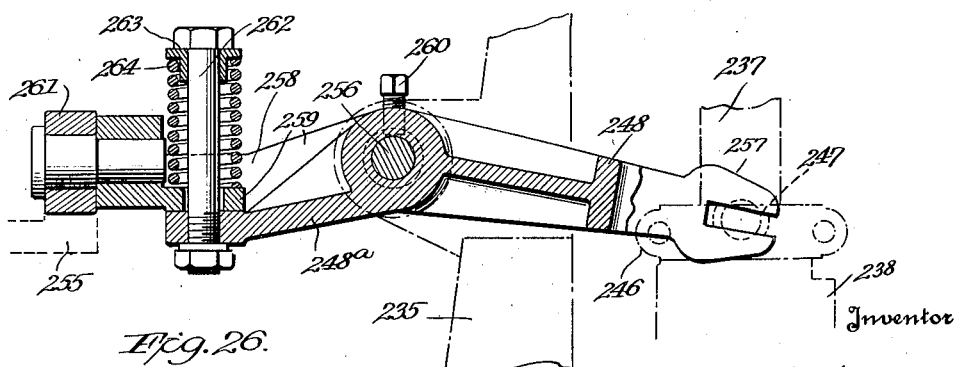
Inventor
Edward G. Bridges
By Emery, Booth, Varney & Holcombe
his Attorneys

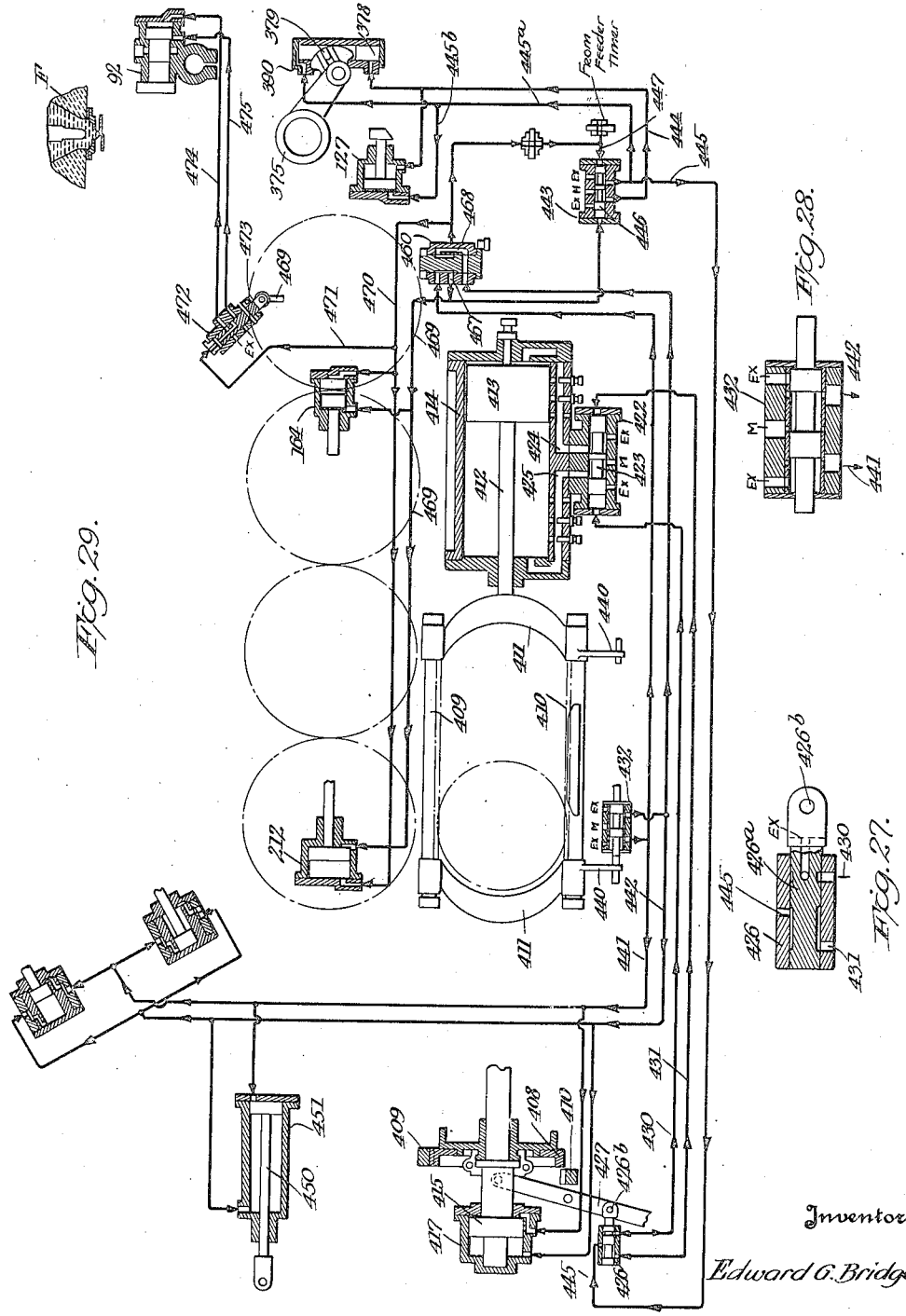

Patented Aug. 4, 1936

2,049,422

UNITED STATES PATENT OFFICE 2,049,422

METHOD AND APPARATUS FOR THE MANUFACTURE OF HOLLOW GLASSWARE

Edward G. Bridges, Anderson, Ind., assignor to Lynch Corporation, a corporation of Indiana Application February 4, 1931, Serial No. 513,383

90 Claims. (Cl. 49—9)

The present invention relates to glassware forming machines, particularly those for the manufacture of hollow glass articles such as bottles, jars and like containers, and aims generally to improve the construction and operation of such machines, both to better the quality and increase the quantity of ware produced and to reduce the trouble and expense of maintaining the machines in good working condition.

The present invention is particularly adapted for the manufacture of hollow glassware wherein the mold charges are automatically formed and fed in a certain predetermined order into a series of inverted parison molds although it will become apparent that certain features of the invention are readily adaptable to other types of machines, as for example, machines wherein the mold charges are sucked from a tank of molten glass. To this end my invention aims to improve the construction of the glass fabricating mechanisms, and the controls therefor so that the fabrication of the glass may be effected during movement of the molds and may be varied and controlled to suit the particular characteristics of any article made by each set of molds, whereby the quantity of finished ware is increased and its quality improved.

Although the major features of my present invention are adaptable for use in a variety of different machines and types, they are advantageously illustrated in a machine of the two-table or rotating carrier type, a preferred embodiment of which is exemplified in the accompanying drawings, wherein—

Figure 2:
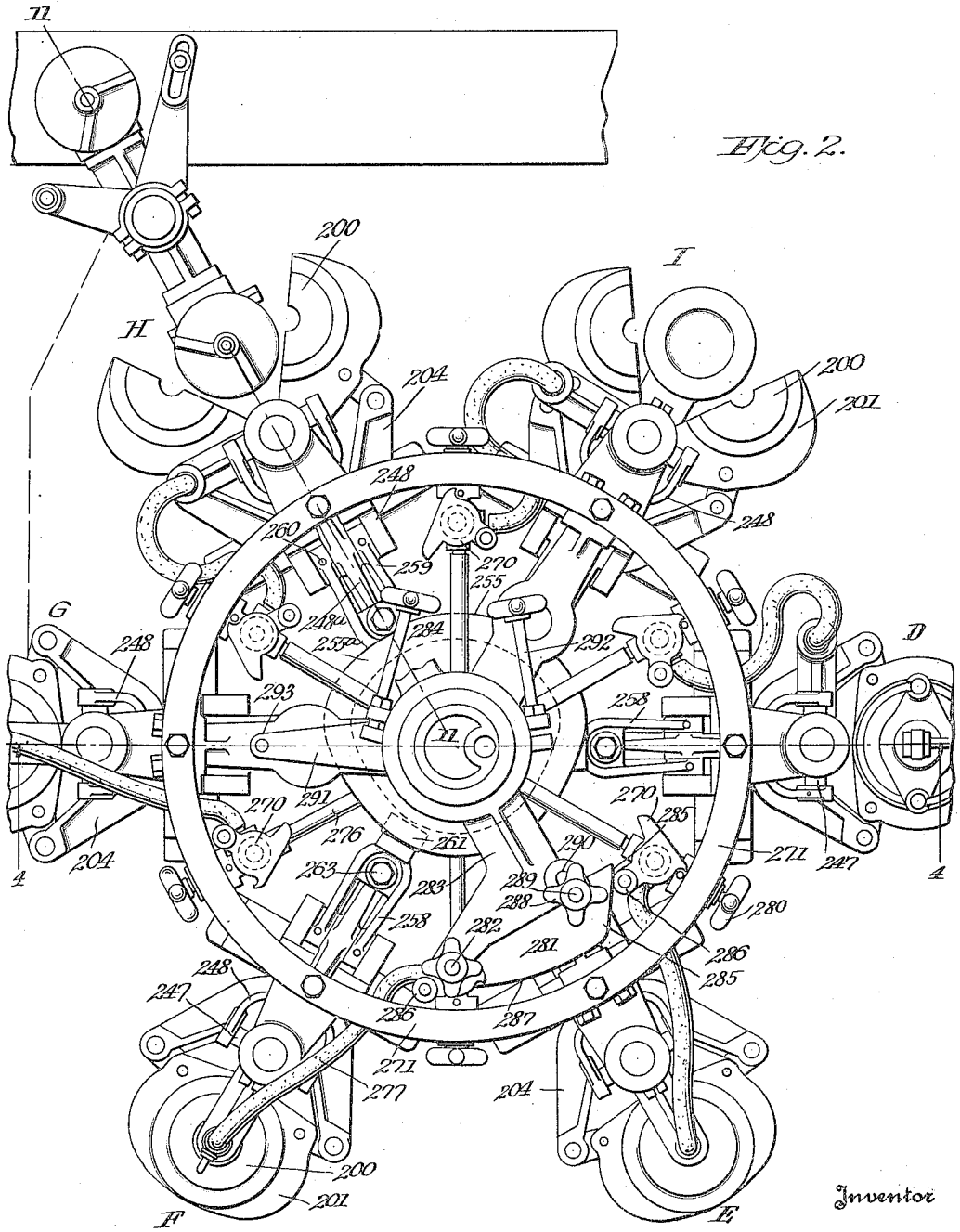
Fig. 2 is a fragmental plan view of the blow or finishing mold carrier and its associated mechanism.
Figure 3:
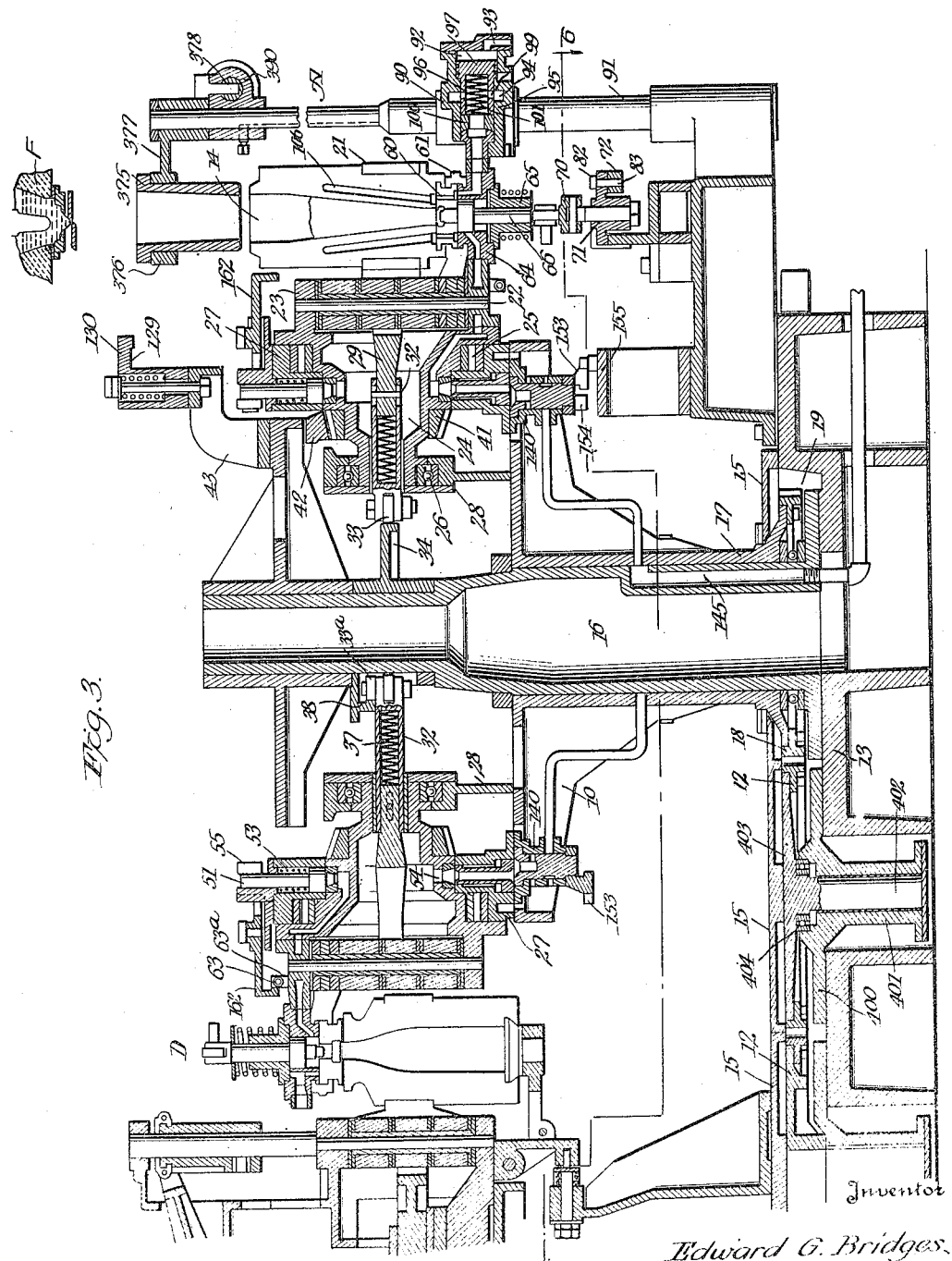
Fig. 3 is a vertical sectional view of the parison mold carrier and its associated mechanism taken on the line 3—3 of Fig. 1.
Figure 4:
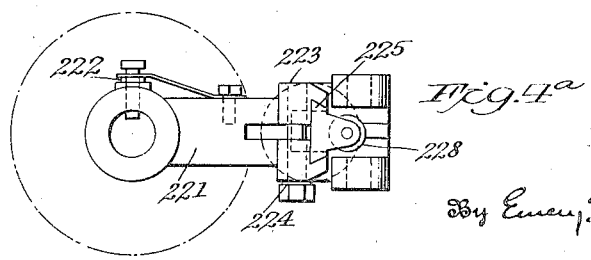
Fig. 4 is a vertical sectional view of the blow mold carrier and its associated mechanism taken on the line 4—4 of Fig. 2.

Fig. 4ª is a detail bottom plan view of the blow mold bottom plate holder;

Fig. 5 is a horizontal sectional view of the blow mold operating mechanism taken on the line 5—5 of Fig. 4;

Fig. 6 is a horizontal sectional view taken on the line 6—6 of Figs. 3 and 4 showing the base and the mechanism below the mold carriers;

Fig. 7 is a sectional view taken on the line 7—7 of Fig. 6 drawn to a larger scale;

Fig. 8 is an enlarged detail longitudinal sectional view of the blowing air control valve;

Fig. 9 is a front elevation of a parison mold assembly, parts being shown in section;

Fig. 10 is a vertical sectional view of a parison mold assembly;

Fig. 11 is a vertical sectional view through the blow mold carrier at the take-out position taken on the line 11—11 of Fig. 2;

Fig. 12 is a detail plan view of the table-turning cylinder;

Fig. 13 is a detail sectional view taken on the line 13—13 of Fig. 14;

Fig. 14 is a detail sectional view taken on the line 14—14 of Fig. 12;

Fig. 15 is a detail sectional view of the resetting air control valve taken on the line 15—15 of Fig. 6;

Fig. 16 is a detail sectional view of the suction control valve taken on the line 16—16 of Fig. 6;

Fig. 17 is a detail sectional view of the combined baffle and blow head shown in Fig. 9;

Fig. 18 is an enlarged longitudinal sectional view of the suction valve shown in Fig. 3;

Fig. 19 is a vertical sectional view of the distributing valve;

Fig. 20 is a diagrammatic sectional view taken on the line 20—20 of Fig. 19 showing the relative position of the parts of the distributing valve as the mold is stopped at the charging position;

Fig. 21 is a similar view, the valve being moved to admit air to the compacting blow head;

Fig. 22 is a similar view, the valve being moved to cut off the compacting air;

Fig. 23 is a similar view taken on the line 23—23 of Fig. 20, the valve being moved to admit counterblowing air;

Fig. 24 is a similar view, the valve being moved to cut off counterblowing air;

Fig. 25 is a detail sectional view of the parison mold inverting gears;

Fig. 26 is an enlarged sectional view of the blow head operating lever;

Fig. 27 is a detail sectional view of the indexing valve;

Fig. 28 is a detail sectional view of the main rack valve; and—

Fig. 29 is a diagrammatic view illustrating the air timing and automatic control of the machine.

The present application is a continuation in part of my copending application Serial No. 408,890, filed November 21, 1929.

The machine selected for illustration in the accompanying drawings is of the well known rotary type adapted for the manufacture of hollow glass containers, such as bottles, jars, and like containers, from measured charges or gobs of glass delivered to it automatically, and in the illustrated example, comprises separate parison and finishing mold carriers laterally spaced and arranged side by side, this form being preferable because of the economy in the number of sets of molds required while providing a maximum bottle forming time and because of the convenience and facility with which a battery of such machines may be arranged around the furnace or tank containing the supply of molten glass, although obviously the invention is equally applicable in many of its features to other types of machines. In the illustrated type of machine the respective mold carriers 10 and 11 are interconnected for movement in unison by means of suitable gearing 12 housed within the base 13 of the machine as disclosed in my co-pending application Serial No. 408,890, the carrier 10 having mounted thereon a plurality of blank or parison molds 14 adapted to be presented in succession in an inverted position at a charging position A, where the mold receives its charge of glass from a mechanical glass feeding device F, as is well understood in the art. Suitable closure plates 15 are adapted to be secured to the upper side of the base 13 and house the gearing 12 (Figs. 3, 4 and 6).

In machines for the manufacture of glass articles adapted to receive their charges of glass from a mechanical feeding device, which I have termed herein "gob fed" machines, as distinguished from machines adapted to gather their charges of glass from an open tank of glass by supplying suction in the molds, the parison molds are presented at the charging station in their inverted position, that is, with their neck end down and their open bottom end uppermost, so that the glass charges or "gobs" may be introduced through the upper open end of the molds. In such machines, following the charging of the parison mold with its charge of glass, the charge is fabricated in the mold, first by compacting the charge in the neck ring of the mold and around the mouth forming pin, preferably by applying differential air pressure to the opposite ends of the charge, to shape and set the mouth finish of the bottle or other article. Thereafter the compacted charge is elongated into a parison while confined in the parison mold by blowing it to hollow form so as to produce a parison of definite length and also prepare it for final blowing in the blow or finishing mold. As the final blowing of the bottle in the finishing mold is preferably done with the parison neck end uppermost, the parison must be reverted to its upright position after the charging and before the final blowing, and advantageously this is accomplished by inverting the parison in the parison mold preferably by rotating the mold with the parison in it about a horizontal axis prior to transferring it to the finishing mold.

Advantageously the respective parison and finishing molds are movable in closed paths intersecting at a common transfer point D (Figs. 1 and 2) so that the parison molds may be gradually opened upon approaching the finishing molds, permitting the parison to be supported in the associated neck rings, and the blow molds may be closed gradually around the approaching parison during movement thereof to the transfer position. In this manner upon arriving at the transfer position, the blow molds partially embrace the parison. When the parison and blow molds come into transferring registry position, the neck rings may be released and the blow molds finally closed so that the blow molds with the parison in it may be moved in a separate path for final blowing and discharge. The final blowing of the article is advantageously effected during movement of the molds from the transfer position D to the discharge position H (Fig. 2) by suitable means arranged to blow the bottle to final form during movement of the blow mold from the transfer position to the discharge position. After the bottle has been blown to its finished form sufficiently to become set and self-sustaining, the mold may be opened and the bottle engaged by a take-out mechanism and laterally removed and deposited upon a conveyor.

*Parison shaping mechanism*

The parison molds 14 may be mounted upon a suitable rotatable support 10 rotatable around a fixed column 16 mounted on the bed frame 13 of the machine (see Figs. 3 and 10). The parison mold support 10 preferably has a depending sleeve 17 embracing the column 14 and carrying at its lower end a gear 18 positioned within an oil reservoir 19 in the bed frame of the machine to mesh with one of the interconnecting gears 12.

The parison molds 14 are preferably of the sectional type, comprising opposed sections carried by holders 21 (see Figs. 3 and 10) pivotally mounted upon a hinge pin 22 in an extension 23 of a mold support 24 rotatable in anti-friction bearings 25 and 26 respectively, in supports 27 and 28 on the mold carrier 10.

The mold supports 24 are each rotatable about a horizontal axis in the bearings 25 and 26 and are hollow to lighten the construction and house the connections for opening and closing the molds at the proper time. These connections preferably include yoke members 29 embracing the hinge pin 22 and the adjacent sides of the molds and connected to the mold halves at their opposed ends by links 30. The yoke members 29 are each slidable in a sleeve 32 journalled in the mold support 24 (see Figs. 3 and 10) carrying at its inner end a roller 33 on a pin and bearing upon the concentric lobe portion of a cam 34 fixedly clamped to the parison mold support column 16. The inward extension 31 of the yoke is slidably connected to the sleeve 32 by a pin 35 working in a slot 36 in the sleeve 32 and a spring 37 may be interposed between the yoke and the sleeve to resiliently urge the yoke into mold closing position.

Figure 1:
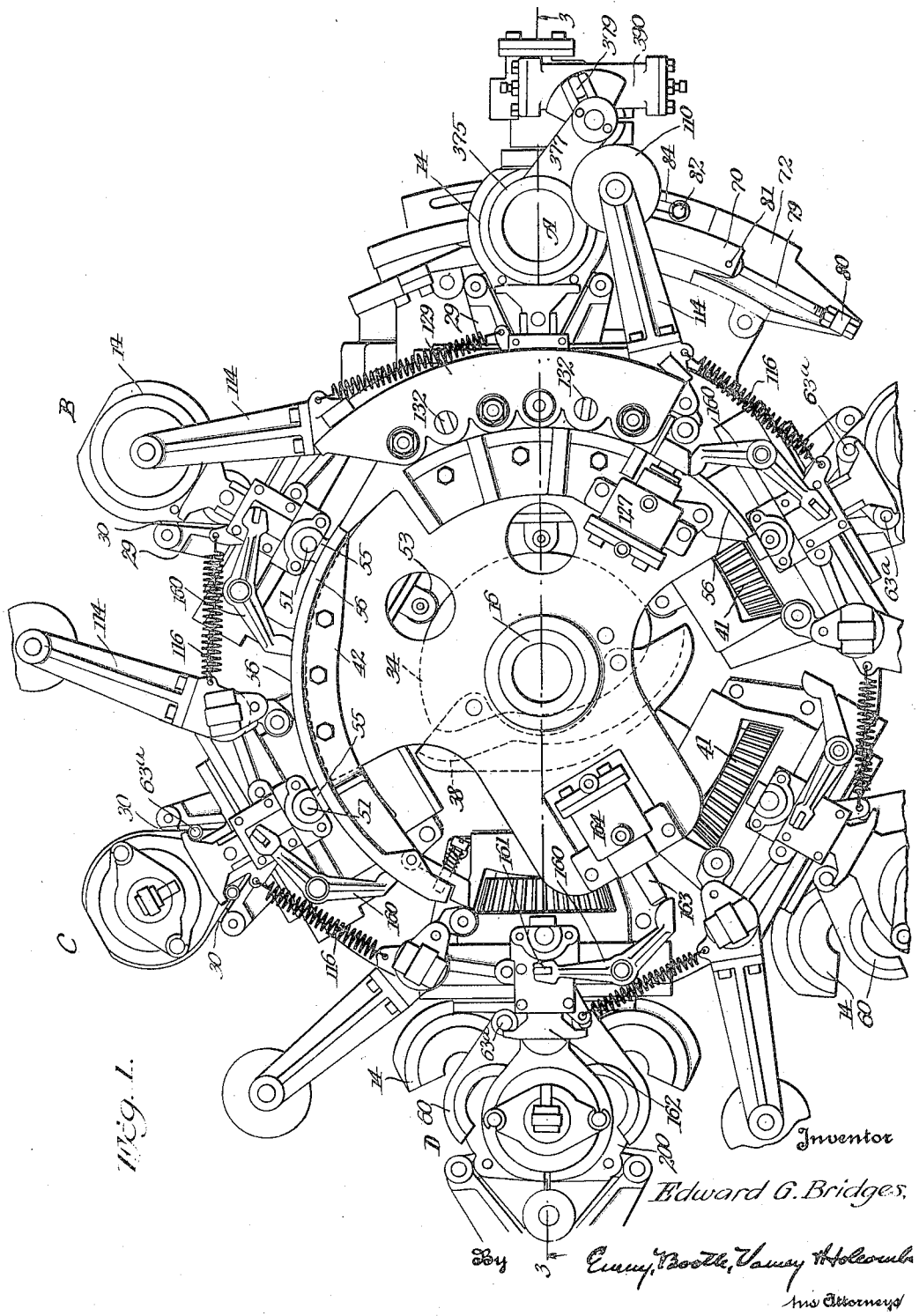
Fig. 1 is a fragmental plane view of the parison mold carrier and its associated mechanism.

The cam 34 is formed with a concentric lobe portion (see Figs. 1 and 10) against which the roller 33 bears to hold the molds tightly closed at the charging position A and during movement of the mold therefrom for a distance to permit the proper shaping and fabrication of the parison which, in the illustrated embodiment, extends to and just beyond the third stop position C (see Fig. 1). From this point the cam 34 is formed with an eccentric trackway 38 to engage the roller 33$^a$ mounted axially of the roller 33 to gradually open the mold sections during movement thereof to the next or transferring position D where the mold sections are fully opened.

The parison mold support 24 may be rotated in its bearings 25 and 26 by suitable means, as for example, the pinion 41 on the support 24 intermediate the bearings and in mesh with a rack member 42 carried by a fixed support or bracket 43 mounted on the column 16 above the molds. The rack member 42 is preferably placed to engage the pinions 41 of the mold supports 24 during movement of the molds between the second stop position B and the third stop position C so as to place the mold in its reverted or upright position preparatory to the opening of the mold. The second rack member 42ª on the opposite side of the mold carrier engages the pinion 41 during mold movement toward the charging position to invert the mold prior to its being presented at that position (see Figs. 1 and 3).

According to customary practice, certain teeth of the pinions 41 and racks 42 and 42ª are cut away as at 45 (see Fig. 25) to facilitate entrance of the teeth of the gears into the rack as well as disengagement of the gear teeth from the rack. In high speed operations of the machine, however, as for example, in operating the machine to produce in excess of thirty articles per minute, the speed of rotation of the mold supports is so high that great difficulty is experienced in stopping the molds in their vertical centered positions.

In order to overcome this objection, at least when used in intermittently rotated machines, I preferably place the racks 42 and 42ª so that the last or leaving tooth is in line with a stop position, as shown in Fig. 25. As the mold is moved to the next stop position, C or A, following reversion or inversion as the case may be, one of the cut away teeth 45 of the gear 41 has passed the last tooth of the rack 42 or 42ª, and the next adjacent tooth of the gear 41, which is full sized, lies against the end face of the last rack tooth, with the mold centered at the stop position. In this position of the mold support 24, centered and at rest at a stop position, it may be locked against accidental rotation out of centered vertical position either during the stop period or immediately as the mold starts its next turning movement.

Preferably the means for locking the mold in its respective upright positions comprises (see Figs. 1, 3 and 10) a locking pin 51 slidably mounted in an opening 52 in the upper portion of the bearing support 27 and normally urged inwardly by means of a spring 53 into locking engagement with one of a pair of oppositely disposed locking pin seats 54 in the rotatable mold support 24. The locking pin 51 is provided at its upper end with a roller 55 adapted when moved with the mold to engage a fixed cam trackway 56 on the support or bracket 43 to lift the locking pin 51 from its locking engagement with the seat 54 in advance of the engagement of the pinion 41 with the rack 42 so as to unlock the rotatable mold support and permit its rotation through 180° by the rack member. The cam trackway 56 is so shaped as to release the roller 55 as the pinion 41 has completed its intermeshing engagement with the rack 42 and the mold has been brought to its vertical position to permit the spring 53 to return the locking pin 51 to its locking position in one of the seats 54 of the mold support 24.

Fabrication of the parison in its proper shape suitable for blowing the bottle to its finished form consists preferably in drawing or compacting the glass charge into the neck end of the parison mold to form the "mouth finish" of the bottle or article and thereinafter admitting air pressure to the mouth end in sufficient volume and pressure to blow the glass parison to hollow form of definite length so that the finished bottles or articles will be of uniform character as to distribution of the glass. Heretofore in commercial machines, the compacting of the glass has usually been accomplished solely by means of air under pressure exerted on the upper end of the charge, and although the use of suction for making the mouth finish has been suggested, it has never to my knowledge, been successful in high speed automatic machines. When compacting pressure air is used and is maintained sufficiently long or under sufficient pressure to permit of adequate compacting of the charge in the neck end of the mold, the upper end of the glass charge is unduly chilled, resulting in a wavy appearance in the side walls of the finished bottle. This is because the glass in the upper end of the charge has become so chilled that it cannot be blown to the same degree or to the same uniform thickness as the remaining portion of the body of the parison, resulting in a thickened region in the side wall of the finished article producing a wavy appearance, and known in the trade as the "compacting wave" or "counterblow wave".

According to my invention the glass is initially compacted in the mold by suction applied axially in the neck molds 60 and laterally throughout a substantial portion of the body of the parison mold 14, as the charge enters the mold, so as to quickly draw the molten glass in the neck mold and around the mouthforming pin without unduly chilling the upper end of the charge. The suction is preferably applied as the charge enters the mold so that the mouth finish is formed immediately while the charge is the hottest. For certain classes and sizes of ware this compacting by suction alone is sufficient but in some instances it may be desirable to additionally compact the charge by an application of air pressure to the upper end thereof. Such further compacting by air must be delicately controlled and should be maintained momentarily so as not to unduly chill the upper end of the charge.

As shown, the neck molds 60 (see Figs. 3 and 10) there being one associated with each parison mold, are formed in sections carried in neck ring holders 61 hingedly mounted on the hinge pin 22 so that the neck mold cavity is in axial alignment with the parison mold cavity. The neck mold sections are normally held together by means of a spring 63 (see Figs. 3 and 10) connected to pins 63ª on each neck mold holder.

Associated with each neck mold holder is a combined suction and blowing unit and a mouth forming pin mechanism which may advantageously include a neck pin housing 64 carried by brackets 64ª on the mold supports 24 in alignment with the axis of the neck molds 60. Removably carried by the housing 64 is a guide member 65 in which is slidably mounted a stem 66 carrying a mouth-forming pin 67 normally extending within the neck mold 60 so as to close the cavity therein. The stem 66 is provided at its opposite end with a roller 68 and an offset arm 68ª, and a coiled spring 69 surrounding the guide 65 is interposed between the base of the guide and a plate 69ª on the stem 66 so as normally to urge the mouthforming pin away from its closed position in the neck mold cavity.

The cam surface 70 (see Figs. 1, 3, 6, 9, and 10) is arcuate in shape to conform to the path of movement of the parison mold and mouthforming pin stem 66 and is preferably resiliently mounted on an arcuate support 71 adjustably slidable horizontally upon a bracket 72 bolted to the bed frame 13 of the machine. The cam 70 is movably mounted in the support 71 by means of guide stems 73 pivotally connected to the cam at 74 and extending through openings 75 in the support 71. The support is advantageously formed with recesses 76 (see Fig. 9) housing springs 77 upon an adjustably mounted plate 78 and bearing against the bottom of the cam 70 so as to resiliently urge it upwardly for contacting engagement with the roller 68.

As the mold is moved to approach the charging position the roller 68 rolls upon the cam surface 70 forcing the mouth forming pin 67 upwardly against the tension of spring 69 to close the cavity of the neck mold. This positioning of the mouth forming pin within the cavity of the neck mold may be terminated immediately after the compacting of the charge and before the counter blowing, or may be maintained until after the counter blowing of the charge is started. For this purpose it is desirable to provide ready adjustment for the withdrawal of the mouth-forming pin which may be readily adjustable during operation of the machine to suit conditions presented depending upon the character of the glass and the nature of the ware being made.

One manner of accomplishing this purpose is to variably adjust the length of the cam surface 70 beyond the charging position and as shown herein, the cam surface and its support 71 are slidably mounted on the bracket 72 and are adjustable therealong by means of an adjusting screw 79 passing through the post 80 on the bracket 72 and pivotally connected to the cam as at 81. The cam 71 and its support 72 may be clamped in the desired adjusted position (see Figs. 3 and 6) by means of clamp nuts 82 on posts 83 on the bracket 72 extending upwardly through arcuate slots 84 of the support. To insure positive withdrawal of the mouth pin at the proper or desired time, the receding end of the cam may be provided with a cam trackway 85 adapted to receive stem 68ª of the roller 68 and pull the mouth pin stem 66 and the mouth pin away from the neck mold cavity. This trackway 85 may be suitably secured to the cam 70 in any conventional manner, but is preferably adjustably secured thereto by means of suitable clamp screws 87 passing through a slotted opening in the body portion thereof.

As each successive parison mold is moved into charging position, its mouth forming pin is raised to close the mouth end of the neck mold and as the mold is stopped to receive its charge, suction is applied in the parison mold to draw the charge quickly into the neck end thereof and compact it around the mouth forming pin. Suction may be applied in any suitable manner desired, but in the intermittently rotated type of machine as shown herein, a stationary suction valve may be used advantageously. As herein shown (see Figs. 3 and 18) a suction valve 90 is mounted upon a post or standard 91 projecting vertically from the bed frame 13 of the machine in position to register successively with the combined suction and blow head unit 64 of the parison molds as they are stopped at the charging position.

The suction valve preferably comprises a casing formed at one end as a fluid pressure cylinder 92 adapted to receive fluid pressure through an inlet 93, an intermediate suction inlet chamber 94 and a guide portion 95 for the valve stem 96. The valve stem 96 is formed at one end as a piston 97 positioned within the cylinder end 92 of the casing. The stem 96 is further provided with ports 99 aligning with the suction chamber 94 when the valve is moved to its operative position (as shown in Figs. 3 and 18). Within the guide portion 95 of the casing is a two-part coupling member 100 having a ground seat, and a spring 101 is positioned within the bore of the valve stem engaging the stem and the coupling member and tending quickly to withdraw the piston and shut off the suction supply as soon as the pressure air is released from the opposite side of the piston. The admission of pressure air in the cylinder 92 and behind the piston 97 moves the piston valve stem toward the combined suction and blow head 64 establishing communication between the suction chamber 94 through ports 99 and central bore of the valve stem, through the coupling 100 which registers with a suction passage 102 of the combined suction and blow head 64.

The suction passage 102 has branch passages 103 and 104 leading respectively to the interior of the head 64 and to passages 105 in the neck molds which communicate with grooves 106 in the parison mold sections communicating with the parison mold cavity through the meeting faces of the mold sections throughout a substantial portion of the length thereof, terminating preferably slightly below the glass level when the charge is packed in the mold. The application of suction to the passage 104 establishes suction communication with the parison mold cavity through the grooves 106 therein and the suction passages 105 extending through the neck mold. Simultaneously suction is applied through the branch passage 103 to the interior of the head 64 through the passage 107 in the mouth forming pin to apply suction to the bottom or inner end of the neck mold cavity, to fill completely the neck mold cavity with glass and form a more perfect neck and mouth finish on the article.

For most types of ware the application of suction to the neck mold cavity and throughout a substantial portion of the parison mold cavity is sufficient to adequately draw the charge of glass into the neck end of the mold and pack it completely around the mouth forming pin so as to properly form the mouth finish of the bottle. With some classes of ware, however, having a mouth finish particularly difficult to make, it may be desirable to augment the compacting by suction with an application of pressure air on the upper end of the charge to compact the glass more solidly.

In the present embodiment of the invention this may advantageously be accomplished by means of a closure head 110 (see Figs. 9 and 17) loosely and detachably mounted as at 111 upon a stem 112 adjustably clamped by clamp nuts 113 in one end of a bracket 114 pivotally mounted upon the bearing support 27 and normally held laterally removed from the axis of the parison mold by means of spring 116, so as to permit charging of the mold from above. The closure head 110 is provided with an air inlet 117 and a valved outlet 118 which is normally held closed by spring 119 surrounding the stem but adapted to be opened by the pressure of the air admitted to inlet 117 to apply compacting air to the upper end of the mold charges. The admission of air to the closure head 110 may be advantageously controlled by a distributing valve (hereinafter referred to) mounted on the underside of the parison mold table 10, there being a distributing valve for each parison mold.

The application of pressure air to the upper end of the charge to further compact the charge should be maintained at most only for a very brief period of time, and as it is desirable to start the counterblowing of the parison as promptly as possible so as to prevent undue chilling of the upper end of the charge, it is advisable to apply the closure head to the mold immediately upon delivering the charge of glass to the mold. This is advantageously permitted, as illustrated, by mounting each closure head arm 114 upon the upper end of a vertical pivot post 121 (Fig. 9) journalled in a vertical bearing 122 on the outer face of the bearing 27, the post being normally held in raised position by suitable means, as for example, a spring 123 surrounding the lower end of the post. Normally the closure is slightly above the plane of the top of the parison mold and held laterally removed from the axis of the mold by means of the spring 116 connected to the arm 114 and to the bearing 27 of the next adjacent mold mounting. The closure head arm 114 is formed with an inward extension 124 (see Figs. 1 and 9), on the opposite side of the post 121 and carries a roller 125 positioned in front of a piston rod 126 of a fluid pressure operated motor 127 fixedly mounted on the bracket 43 above the parison mold carrier 10. As will be explained later, the fluid pressure motor 127 receives pressure air for its operation simultaneously with the shifting of the primary valve controlling the machine upon delivery of a charge to the mold so as to bring the closure head 110 over the mold just in advance of its movement away from the charging position and immediately after and in predetermined timed relation to the charging thereof.

As the mold moves away from its charging position, a roller 128 on the upper end of the closure arm 114 immediately is moved under a cam member 129 having a horizontal cam surface 130 to hold the closure head tightly against the mold to close the cavity thereof. A vertical cam surface 131 of the cam member 129 is adapted to be engaged by the roller 125 and hold the closure head in position axially of the mold during that portion of mold movement in which the parison is fabricated in the parison mold while confined therein by the closure head.

The cam 129 may be of any suitable construction for the purpose of holding the closure head tightly against the mold and axially of the parison mold cavity to effectively close it and in the illustrated embodiment herein shown (see Figs. 1, 3, 9 and 10) comprises an arcuate shaped body suitably supported on guide pins 132 projecting from the upper sections of the front end of the bearing 27. The cam body is provided with a plurality of upwardly opening recesses 133 in which are housed springs 134 surrounding stems 135 providing means for exerting a resilient pressure for applying the closure head to the mold.

As stated above, the compacting pressure air if used at all, need only be applied to the upper end of the charge momentarily to be effective to additionally compact the glass around the mouth forming pin when making certain kinds of ware and advantageously this compacting air is terminated during the first portion of mold movement away from the charging position by actuating the distributing valve to cut off the pressure air communicating with the closure head 110 and open communication to the mouth end of the neck mold cavity through a cored passage 136 (Fig. 10) in the mold support 24 through one of the locking pin sockets 54 and communicating with a pressure air passage 137 in the combined suction and blowing unit. As the distributing valve is operated in the very early period of mold movement away from the charging position, the counterblowing pressure air is admitted through cored passages 136 and 137 to the mouth end of the parison thereby to elongate the cavity therein and blow the parison to hollow form while confined in the parison mold by the closure head 110.

Advantageously the mouth forming pin head is provided with passages 138 and 139 for the passage of pressure air to the mouth cavity of the parison, so that the machine may be operated to effect counterblowing of the parison either before or after withdrawal of the mouthforming pin.

The distributing valve (see Figs. 3, 10 and 19) which controls the pressure air for the additional compacting as well as for counterblowing the parison in the parison mold comprises a valve casing 140 suitably secured to the underside of the bearing support 27 substantially in line with the locking pin sockets 54 of the mold support 24. The bearing support 27 of the parison mold units is provided with a bushing 141 between the locking pin socket 54 and the distributing valve 140. This bushing 141 is in the form of a piston adapted to be moved upwardly so as to present an airtight connection with the lock pin sockets upon the application of air pressure to the lower enlarged head thereof.

The valve casing 140 has an inlet port 142 receiving air pressure through a pipe line 143 leading to a port 144 in the sleeve 17 of the parison mold carrier, said port adapted to have communication with an air pressure supply groove 145 in the column 16 during a period of rotation of the mold carrier. A valve stem 146 is rotatably mounted within the casing and is provided with segmental circumferential pressure and exhaust grooves 147 and 148 respectively in the plane of the inlet 142 and communicating with an outlet 149 to supply pressure air to and exhaust air from the closure head 110 by means of pipe 112ª and bore 112ᵇ. The second inlet 150 receiving pressure air from the line 143ª communicates with a radial port 151 in the upper end of the valve stem 146 having an axial outlet 152 communicating with piston bushing 141.

The valve stem 146 is provided at its lower end with a radially extending actuating finger 153 and a radially extending resetting finger 154 spaced substantially 120° apart, and which are adapted for engagement with stops or pins adjustably carried in a fixed bracket 155 secured to the base 13 of the machine below the parison mold carrier.

Referring more specifically to Figs. 6, 10 and 19 it will be observed that as a parison mold is brought to the charging position, the actuating finger of the distributing valve for that mold engages the stop or pin 156 adjustably clamped in slot 157 of the bracket 155. At this time the parison mold is momentarily standing at the charging position to receive its charge, after which the closure 110 is moved into position over the upper end of the mold by actuation of the fluid pressure operated motor 127. As the mold is moved away from its charging position, the roller 128 quickly rides under cam 129 to apply the closure 110 to the mold, and at the same time the actuating finger 153 engages the stop 156 and moves it in a clockwise direction to position pressure groove 147 between inlet 142 and outlet 149 and admit pressure air to the closure head and upper open end of the mold to compact the charge around the mouth forming pin as shown in Fig. 21. Engagement of the finger 153 with the pin 156 rotates the valve stem 30° where the actuating finger 153 engages stop or pin 156ᵃ adjustably clamped in slot 157ᵃ in the bracket 155, which during movement of the mold, rotates valve stem an additional 30° shutting off air pressure flow to outlet 149 and placing the outlet 149 on exhaust through groove 148 and exhaust outlet 149ᵃ as shown in Fig. 22, thus terminating the compacting blowing upon the upper end of the glass charge in the mold. Continued movement of the mold causes the actuating finger 153 to engage a third stop 156ᵇ adjustably clamped in slot 157ᵇ in bracket 155 to rotate valve stem an additional 30° placing radial port 151 in line with inlet 150 as shown in Fig. 23 to permit pressure air to flow through axial outlet, bushing 141, cored passage 136, 137, 138 and 139 to the mouth end of the parison, thereby to expand the parison into hollow form in the parison mold. The counter blowing of the parison continues during movement of the mold up to and during the first stop period at station B; after which it is automatically discontinued, the closure 110 is removed and the mold rotated about a horizontal axis to revert it to upright position.

As the mold leaves station B, the resetting finger 154 engages a fourth stop pin 156ᶜ adjustably clamped in slot 157ᶜ in bracket 155, and positioned inwardly of the path of movement of the valve 120, and moves valve stem 146 backward in a counter-clockwise direction, closing communication between inlet 150 and radial port 151 and registering radial port 151ᵃ with exhaust outlet port 150ᵃ to permit the air to exhaust out of the lines and inside of the parison so that when closure 110 is removed the parison will not expand due to trapped air (see Fig. 24). Further rotation of the mold away from the stop position, quickly reverses and resets valve stem 146 to its position as originally described so that it will be in proper position as the mold again comes into its charging position.

Obviously by adjusting the position of the respective stops or pins 156, 156ᵃ, 156ᵇ and 156ᶜ in their respective slots 157, 157ᵃ, 157ᵇ and 157ᶜ the length and duration of the compacting blowing and counterblowing time may be adjusted and variably controlled to suit conditions peculiar to the type and kind of ware being made.

The blowing of the parison in the parison mold to its hollow form is for the purpose of initially shaping the parison suitable for subsequent final blowing as well as to sufficiently chill the outer wall of the parison so as to form a hardened skin around it so that the parison may sustain itself while supported from its neck end during transfer from the parison mold to the finishing mold. This is advantageously accomplished when embodied in an intermittent machine by maintaining the counterblowing of the parison through the movement of the mold from the charging position to the next stop position B and during the stop period at such second position as described above. Upon movement of the mold away from the second position B, the roller 55 of the lock pin 51 is moved into the cam trackway and lifts the locking pin against the tension of spring 53 away from the locking pin seat 54, permitting rotation of the mold support by reason of intermeshing of the pinion 41 and rack 42 to revert the parison mold to its neck end up position. Advantageously this takes place during mold movement from position B to the third stop position C. Also as the mold moves away from position B, the closure 110 is removed by reason of rollers 125 and 128 riding from under cam 129 permitting spring 116 to quickly return the closure 110 to its normal inoperative position laterally removed from the axis of the parison mold. Thus the closure plate may be applied to the mold from station A to some point beyond station B.

During the next succeeding movement of the mold i. e. from position C toward the transfer position D, the roller 33ᵃ on the sleeve 32 enters the trackway 38 of the cam 34 and withdraws the sleeve 32 and yoke 29 axially of the mold support 24 to separate or open the parison mold sections, leaving the moving parison exposed and supported by the neck molds 60 which are still held closed around the neck end of the parison by reason of the spring 63.

Simultaneously with the movement of the exposed parison supported in its neck ring toward the transfer position, the blow or finishing molds are being moved in a path that will intersect the path of the parison at the transfer position and are gradually closed around the approaching parison during movement to the transfer position, the finishing molds partially surround the parison which is still supported by the neck ring. Hence at the time of stopping the parison at the transfer position the transfer is partially completed and all that remains to be done to complete the transfer are the disengagement of the neck mold from the parison and the final closing of the finishing mold which take place in the order named.

The disengagement of the neck mold sections may be permitted by suitable mechanism herein illustrated as including a bell crank lever 160 (see Figs. 1 and 9) pivotally mounted on the upper outer end of the bearing 27 and having one of its ends slidably connected with the pin 161 of a yoke 162 slidably mounted upon the bearing 27 and adapted to engage the pins 63ᵃ on the sectional neck ring holders. The opposite end of the lever 160 is positioned in front of a piston rod 163 of a fluid pressure operated motor 164 which is operated to actuate the bell crank lever 160 as the neck mold comes into transfer position, and retract the yoke 162 causing, by reason of its engagement with the pin 63ᵃ on the neck ring holders, the opening of the neck rings and the release of the parison into the finishing mold.

Final blowing mechanism

The finishing molds 200 (see Figs. 2, 4 and 11) as stated above, are mounted upon the finishing mold carrier 11, and are movable in a closed path intersecting the path of the parison molds at the transfer position D and upon stopping at such position, the molds almost completely embrace the parison supported by the neck molds 60.

The finishing molds are preferably of the sectional type, similar in construction to the parison molds, being carried in sectional holders 201 suitably mounted upon hinge pins 202 in brackets 203 securely mounted upon the finishing mold carrier 11. The molds are adapted to be moved to open and closed position by means of yokes 204 slidably mounted upon brackets 203 and connected at their outer ends with the mold holders by means of links 205. As the mechanism for opening and closing the finishing molds is essentially the same as applied to the opening of the parison molds, it need not be further described other than by general reference to the roller 206 resiliently connected by spring 207 with the yoke 204 and adapted to engage the cam 208 (Figs. 4 and 5) for opening and closing the molds as desired. On approaching the transfer position the roller 206 travels in a trackway 209 of the cam 208 and this trackway is so shaped as gradually to close the finishing mold around the moving parisons as they approach the transfer position in unison. When the finishing mold reaches the transfer position, the roller 206 is moved out of the trackway 209 and moves within a fork 210 on a piston rod 211 of a fluid pressure operated motor 212 fixedly supported on a bracket 213 connected to the cam 208 and carried on column 214 on which the blow mold carrier is rotatably mounted.

As will be explained hereafter, the fluid pressure motor 212 receives air pressure to actuate it in mold closing direction during the brief interval of time that the mold is standing at the transferring position, and preferably this is timed to occur just following the disengagement of the neck rings from the parison. Radial outward movement of the fork 210 and the roller 206 to close the mold, positions the roller in line with the concentric lobe portion of the cam 208, so that upon the next succeeding movement of the mold away from transferring position, the mold is held tightly closed by reason of the engagement of the roller 206 upon the concentric lobe portion of the cam 208.

As is customary in the art, the finishing molds may be open at the bottom end and are adapted to be closed at the time of receiving the parison and during the final blowing of the articles therein by means of bottom plates 220 (see Figs. 4 and 4ᵃ removably held in bottom plate holders 221 by means of pins 222. The inner ends of the holders are bifurcated to form vertical slides 223, with an undercut groove clamped at 224 to vertical guides 225 pivoted to the mold support at 226. A clamping nut 224 is provided for clamping the slides to the guide. Thus the holders 221 may be adjusted along the guides 225 so that the bottom plates may be positioned vertically to accommodate finishing molds of different heights. The lower end of each guide is preferably provided with a roller 228 adapted to roll upon a cam surface 229 carried by pins 230 slidable in an arcuate support 231 bolted to the bed frame of the machine and thus providing a cam surface for rocking the guides about their pivotal support 226 and thus moving the bottom plates into and out of position to close the bottoms of the finishing molds at the desired time. Advantageously, the cam 229 is resiliently held in its proper position by means of springs 232 surrounding the pins 230 so that a yielding pressure is exerted on the bottom plates to hold them in position to close the bottoms of the finishing mold.

The brackets 203 providing a mounting for the hinge pins 202 of the finishing mold holders 201 are formed each with an upwardly extending standard 235 having a lateral extension 236 at its upper end providing a bearing for the upper end of a post 237, the lower end of which is secured in the upper portion of the bracket 203 preferably axially of the hinge pin 202. Individual blow head carriers 238 for each blow mold are slidably and rockably mounted upon the posts 237, each comprising a sleeve portion embracing the post and formed with a laterally projecting arm 239 terminating in a cylindrical bushing 240. A blow head stem 241 is adjustably mounted in the bushing 240 by means of adjusting nuts 242 threadedly engaging the stem above and below the bushing and a cup-shaped blow head 243 is removably secured to the lower end of the stem 241.

The blow head 243 has a relatively deep cavity 245 therein in communication with a passage in the hollow stem 241 for the admission of pressure blowing air to the blow mold to blow the bottle or article to finished form therein. The cavity 245 in the blow head is sufficiently deep to enable the blow head to embrace the neck finish of the bottle or article which is exposed from the finishing mold, and as will be apparent, provides a means for steadying and centering the bottle upon the bottom plate 220 as the blow molds open.

The sleeve portion 238 of the blow head carrier is provided at its upper end with a split collar 246 through which it is connected by pins 247 to a blow head operating lever 248 adapted to be operated to raise and lower the blow head at the proper time (see Fig. 26). The blow head is normally in its raised position laterally removed from the axis of the finishing mold so that the raising and lowering movement of the blow head must be combined as a lateral swinging movement. To this end a roller 249 on the post 237 is positioned in a cam slot 250 of the sleeve portion 238 so that reciprocating movements of the lever will impart a vertical reciprocating and lateral swinging movement of the blow head 243. The cam slot 250 is so shaped that in moving the blow head into engagement with the mold, the blow head is first laterally swung to a position axially thereof and then is lowered vertically a sufficient distance to enable the cupped blow head to be accurately positioned over the exposed neck end of the bottle or other article being made.

The blow head operating lever 248 (Figs. 4 and 26) may be formed in two sections resiliently coupled together and actuated by a cam 255 fixed upon the central column 214 of the blow mold carrier so that the pressure exerted upon the blow head in moving it toward the mold will be a resilient one preventing serious damage and breakage to the exposed necks of the bottles should the parts be not properly aligned. One part of the lever 248 is loosely mounted upon a pivot pin 256 rockably mounted in the standard 235 and has an outer forked end 257 straddling the split collar 246 and engaging the pins 247 through a slotted connection. The other end 248ᵃ of the forked lever 248 extends inwardly between forked portions 259 of the other section 258 of the lever which are securely clamped to the pivot pin 256 by set screws 260 and carries at its other end a roller 261 engaging the cam 255. A threaded post 262 on the inner extension of the arm 248ᵃ extends loosely through the portion 259 and at its upper end is provided with a limiting nut and a washer 263 engaging a coiled spring 264 positioned between the washer and the lever portion 259. Thus vertical movements of the lever portion 258 through engagement of the roller 261 with the cam 255 will transmit motion through the resilient connection to the forked lever 248 to move the blow head carrier 238 vertically on the post 237.

Admission of the blowing air to the blow head for blowing the bottle to its finished form may be controlled as to the time of starting, duration, volume and pressure by any suitable means, but as shown herein the blowing air for the blow head 243 is controlled by suitable distributing valves 270 (see Figs. 2, 4 and 8), one for each blow head, and adjustably mounted upon a suitable support or frame consisting of a rim member 272 mounted at spaced intervals upon the standards 235 by means of suitable fastenings and preferably connected to a collector ring or hub 273 by means of arms 274 fastened to the rim by screws or other suitable means. The valves 270 are preferably of the rocker type and are adapted to control the supply of blowing air from a suitable source, as a cored passage 275 in the column 214 through the collector ring hub 273 and flexible conduits 276 from the collector ring to each of the valves 270. Flexible conduits 277 are provided for connecting each of the valves 270 with its blow head 243.

It is desirable to control the commencing of the blowing air for each of the blow heads independently of the others, so as to suit the particular characteristics of the parison in the corresponding finishing mold, and accordingly the distributing valves 270 are adjustably mounted upon an annular frame 271 by means of stems 278 on the distributing valves adjustably clamped in slots 279 in the frame. Suitable clamping units or hand wheels 280 may be threaded upon the stems 278 whereby the valves may be adjustably clamped to the rim at the desired angular position. Obviously as each valve is moved on the rim toward or from the radial axis of the blow head and mold, the commencement of the final blowing operation of the mold is advanced or delayed as desired.

Actuation of the valves 270 to admit blowing air from the conduit 276 to the blow head 243 may be accomplished by means of a cam 281 (see Fig. 2) pivoted as at 282 to an arm 283 adjustably clamped upon the column 214 by suitable means, as for example, a hand clamp 284. Cam 281 is advantageously formed with an inclined face 285 adapted to engage rollers 286 on arms of the stems of the distributing valves 270 and also has a long face 287 for controlling the rate of opening of these valves. In order to control the degree of opening and hence the volume and pressure of the blowing air, the cam 281 may be adjustably clamped upon the arm 283 by means of a clamping nut 288 on a stud 289 on the cam and which stud extends through an elongated slot 290 on the arm 282.

By reference to Fig. 2 it will be apparent that when the cam 281 is clamped in its inward position, the roller 286 may ride only upon a short portion of the inclined surface 285 of the cam, thus slowly rocking the valve to partially open it, and admit a relatively small amount of pressure air to start slowly the blowing of the article in the finishing mold. As the valve continues its movement along the cam surface 287 which is inclined outwardly from the vertical axis of the column, it is gradually opened to full open position, thus progressively increasing the volume and pressure of the air admitted to the blow head. This is particularly desirable in cases where temperature and consistency of the glass in the parison varies, i. e. with hot and cold spots therein, in which case a slow application of air pressure gradually building up in volume and pressure from a minimum to full strength permits of slower expansion of the hotter portions and allows more reheating of the cooler portions, thereby resulting in more uniform expansion of the parison.

Present day machines must be readily adapted to the manufacture of various kinds of ware. In some cases it is not necessary to gradually increase the volume and pressure of the blowing air and is desirable to quickly admit blowing air in full volume and pressure to the blow head. For this purpose the cam may be adjusted to its outward position as shown in full lines Fig. 2, wherein the roller 286 will ride upon the full length of the inclined surface 285 of the cam to quickly open the valve 270 to its full opened position as the roller reaches the long face 287 of the cam. As will be apparent, suitable volume and pressure of blowing air may be controlled by intermediate adjustments of the cam between its extreme positions.

It is desirable to continue the blowing air for as long as possible to facilitate cooling and settling of the article in the finishing mold. In the illustrated embodiment the final blowing operation is terminated by rocking the valve 270 back to its normal closed position, which is advantageously accomplished by means of an arm 291 adjustably clamped to the column 214 by a hand clamp 292 and having a roller 293 lying in the path of the arm 270ᵃ of the distributing valves 270 to return the latter to normal closed position.

It is apparent that the supply of blowing air to the blow heads, being controlled by the distributing valves 270, is independent of the raising and lowering of the blow heads, and in some instances it is advantageous to blow air upon the finished bottle after the mold sections have started to open so as to additionally cool it to render it more self-sustaining when removed from the machine. This may be accomplished in the present machine by the proper positioning of the roller 293 so as to permit of the continued application of blowing air to the blow head after the blow head has been raised by the blow head operating lever 248 and after the molds have been partially opened upon approaching the take-out position by reason of the roller 206 entering the trackway 209 of the cam 208. As will be apparent from Fig. 5, as the blow mold is moved toward the take-out position, the roller 206 enters the trackway 209 and is slowly moved inwardly to partially separate the blow mold sections. At this time the blow head may be partially lifted by the cam 255ᵃ so that only the lower edge of the cupped blow head engages the neck finish of the article to support it and steady it and prevent it from sticking to either of the blow mold sections as they are opened. The continued supply of cooling air to the bottle through the blow head will additionally cool it and will not force it out of shape because the pressure is not confined therein.

Upon arrival at the take-out station, the roller 206 is positioned behind a finger 295 and a bell crank lever 296 pivotally mounted upon a bracket carried by the blow mold column 214, the other arm of the lever 296 having a pin and slot connection with the fork member 210 for closing the blow mold at the transfer position. As a mold reaches transfer position at the end of the turning movement of the mold carriers, the starting valves are immediately actuated to supply pressure air to the various fluid pressure motors at the operating positions, and it will be apparent that the operation of the motor 212 will move the blow mold to close it around the parison at the transfer position and through bell crank lever 296 will completely open the finishing mold at the take-out station.

*Take-out mechanism*

As the finishing mold with the exposed finished bottle or article in it is moved and stopped at the take-out station, it is brought into registry with suitable take-out mechanism, comprising a rotatable member carrying article-gripping devices adapted to grip and lift the ware from the bottom plate of the mold and upon rotation, to remove it therefrom and deposit it upon a suitable support, as for instance, a conveyor 297. The take-out mechanism may advantageously comprise a vertical shaft 298 journalled at its lower end for rotation in a bearing 300 on the outer end of a bracket arm 301 securely bolted to the base of the machine (see Fig. 11) and journalled in its upper end for rotation in a bracket arm 302 carried by the upper end of the column 214 of the blow mold carrier. The outer end of the bracket arm 301 is recessed at 304 to provide an oil reservoir for suitable gearing 305 connecting the shaft 298 to a horizontal shaft 306 journalled in a bearing 307 on the bracket 301 and adapted to be rotated in synchronism with the movements of the mold supports by means of a beveled gear 308 on the blow mold carrier, and pinion 309 on the shaft 306.

A plurality of ware gripping devices 310 are suitably mounted upon the outer ends of arms 311 of a bracket keyed as at 312 for rotation with the shaft 298 and adjustable thereon by means of an adjusting clamping nut 313 threaded upon the shaft so that the position of the bracket and the gripping devices 310 may be adjusted vertically to effect gripping and removal of ware of varying heights. The gripping devices 310 are preferably fluid pressure operated by motors 314 and are advantageously connected for simultaneous operation in opposite directions so that as one gripping device is operated to engage the article and lift it from the bottom plate, the opposite gripping device is operated to lower the article and deposit it upon the conveyor.

Charging mechanism

The illustrated embodiment of the machine is designed to receive its glass charges from an automatic charge forming a feeding device, graphically represented at F (Fig. 3) which may be of any approved construction suitable for shaping and delivering pre-formed charges of molten glass at regular intervals. Such feeders comprise a receptacle for the molten glass, associated with the melting tank, and an impeller working within the receptacle and adapted periodically to extract portions of molten glass through a discharge orifice, to present descending gobs of glass between a suitable moving shearing device operated in synchronism with the impeller to sever the decending glass in gobs of predetermined size and weight.

Charging of the glass into the inverted parison mold at the charging position is facilitated by means of a charging or guide funnel 375 (Figs. 1 and 3) supported in a guide ring holder 376 on the end of an arm 377 pivoted upon post 91 for swinging movement to and from a position axially over the open ended mold. Lateral swinging movement of the arm 377 and funnel 375 is effected by means of a fluid pressure operated piston 378 having a pin and slot connection as at 379 with the arm 377 and working in a cylinder 380 clamped upon the post 91. As will be described later, fluid pressure is admitted to one end of the cylinder 380 simultaneously with the admission of fluid pressure to the rear end of the fluid pressure operated motor 127 for swinging the funnel 375 out of position axially over the mold simultaneously with the swinging of the closure 110 over the mold.

Rotating mechanism and automatic timing of the machine

The mold supports 10 and 11 journaled respectively upon their supporting columns 16 and 214 are rotated in unison through means of the interconnecting gearing 12 as above described and may advantageously be rotated intermittently in quick succession by means of suitable mechanism.

As herein shown the interconnecting gearing for the mold carriers is housed within a well 19 in the base and is adapted to be closed by cover 15 so as to protect the gearing from articles of glass and other foreign matter and to permit the gears 12 to run in oil or suitable lubricant. In order that each gear, with its support and bearing, may be bench-assembled and inserted in and removed from the machine as a unit (see Fig. 3) a suitable support 400 is provided, adapted to be bolted or otherwise secured in the well 19 of the base and is preferably formed with a depending central sleeve portion 401 providing a bearing for a stub shaft 402 having a gear hub 403 integral therewith, the gears 12 being in the form of ring gears and bolted to the flanged periphery of the hub 403. Suitable antifriction bearings 404 are provided between the gear hub 403 and support 400 so as to reduce friction between the rotatable gear 12 and its fixed support 400.

The mold carrier rotating mechanism preferably is fluid pressure operated so as to provide a yielding and flexible power source for the rotation of the mold carriers capable of yielding to stop the machine in the event that any working part becomes jammed, as frequently occurs, and is further adapted to rotate the mold carriers intermittently in quick succession during each stroke of the fluid pressure motor so as to approach the speed of continuously rotating machines, the molds stopping in their rotation momentarily, which is long enough to permit charging, transfer and discharge.

According to the illustrated form of the invention a spur gear 405 may be fixedly connected to one of the sleeves 17 of the mold carriers, preferably the blow mold carrier 11, and is adapted for meshing engagement with an elongated driving pinion 406 for effecting intermittent rotation of the spur gear 405 and respective mold carriers. The pinion 406 is preferably rotatably mounted upon a vertical post 407, mounted on the base parallel to the axis of the blow mold carrier 11 (see Figs. 6 and 7).

Rotation of the pinion 406 may be effected through a pinion 408 fixedly attached as by bolts or otherwise to the lower flanged portion of the pinion 406 and adapted to mesh alternately with oppositely disposed racks 409 and 410 connected by yokes 411 of a fluid pressure operated actuator comprising a piston rod 412 of a piston 413 working in a cylinder 414. In order to effect successive rotation of the mold carriers in the same direction on each reciprocation of the table actuating piston 413, relative shifting movement between the racks 409 and 410 and the pinion 408 is necessary and in the embodiment shown, provision is made for shifting the pinion 408 first into engagement with the rack 409 and then into engagement with the rack 410. For this purpose the racks 409 and 410 are mounted to slide in different horizontal planes as clearly shown in Fig. 7 but are only slightly spaced vertically so that the pinion is in meshing engagement with one of the racks before it is unmeshed from the other rack to prevent accidental rotation of the molds during stop periods, thus to provide a self-locking feature for the mold tables when at their position of rest.

The mechanism for shifting the pinion 408 (see Fig. 7) into engagement with the racks 409 and 410, respectively, comprises a piston 415 on the lower end of the sleeve 416 surrounding the post 407 and working in an air cylinder 417, the sleeve 416 being connected to the pinion 408 by means of a split collar 418, and relative rotative movement between the sleeve 416 and pinion 408 being permitted by means of anti-friction bearings. It will be observed from Fig. 7 that when the piston 415 is raised within its cylinder 417, the pinion 408 will be in mesh with the high rack 409. As the pressure in the cylinder 417 is reversed to lower the piston 415 therein, during a stop period of the mold carriers, the pinion 408 is immediately engaged with the rack 410, which acting also through rack 409, locks the mold carriers against any accidental movement during said stop period. Continued lowering of the piston 415 and pinion 408 brings the latter out of meshing engagement with the rack 409 and into meshing engagement with the oppositely disposed rack 410.

Means are provided to guide the racks in their respective movements to hold them firmly in mesh with the pinion 408 and for this purpose guide rollers 420 and 421 are adjustably mounted upon the base or other suitable support preferably in alinement with the axis of the pinion 408 and adapted to bear against the outer faces of the racks 409 and 410 respectively to hold them firmly in their plane of reciprocation and against the pinion 408.

Respective movement of the piston 413 to effect rotation of the mold carriers may advantageously be perfected by admitting fluid under pressure, as for example, compressed air, alternately into opposite ends of the cylinder 414 by means of a suitable driving cylinder valve 322 herein shown as a fluid pressure operated valve (see Figs. 12 and 29). The valve may comprise a casing or cylinder in which reciprocates a piston valve 423 adapted to establish communication between a constant source of pressure air supply M and the outlet ports 424—425 which lead to opposite ends of the cylinder 414 as is well understood. The supply of fluid pressure to the respective ends of the valve casing 422 to shift the piston valve 423 is regulated by an indexing valve 426 (see Figs. 7, 27 and 29) which may advantageously be operated by a suitable movable part of the machine as for example, an operating lever 427 (Figs. 6 and 7) pivoted to a suitable support as at 428 and connected as at 429 to the split collar 418. The valve 426 may advantageously be a piston valve of the usual type adapted in its opposed positions to admit fluid pressure air from the source of supply through lines 430—431 (see Fig. 29) connected to the opposite ends of the valve casing 422 to control the shifting of the valve piston 423 therein and thus supply fluid pressure through ports 424 and 425 respectively, to the opposite ends of the cylinder 414. This indexing valve 426 (see Fig. 27) may be of suitable design adapted to admit air under pressure from a suitable source M, preferably controlled by a timing valve, to the opposite ends of the valve casing 422, and in the present embodiment it is preferable that the valve stem 426ª control the air at the proper time after the table rotating movements have been completed and relative shifting effected between the racks 409 and 410 and the pinion 408. Accordingly, I find it advantageous to operate the valve stem 426ª from a shiftable driving unit, preferably from the lever 427 connected to the shiftable pinion 408, which is controlled by the position of the piston 415 in the cylinder 417 to which air is supplied from a suitable source through main air valve 432 controlled by the table rotating mechanism, for example, a reciprocating valve arranged to be actuated at the ends of the opposite strokes of the fluid pressure actuator as clearly shown in Figs. 28 and 29.

Thus a simple and efficient automatic control is provided for the carrier turning mechanism through a main air valve 432 arranged to be operated on opposite strokes of the actuator 413 and which in turn controls the admission of air to the opposite end of the cylinder 417 to shift the piston 415 therein and the pinion 408 carried thereby into meshing engagement with the opposite rack, thus positioning the gearing in readiness for the next succeeding turning stroke. In shifting the piston 415 the index valve 426 is likewise reversed through the lever 427, so that the next supply of air pressure at the proper time as determined by the timing valve will reverse the position of the driving cylinder valve piston 423 and admit air into the opposite end of the cylinder 414. The several valves and their connecting parts exhaust back through these supply lines as is well understood in the art so that the proper timing of the operation of any of the fluid operated parts may be adjusted and controlled through suitable choke or cushion valves.

The fluid pressure cylinder 414 housing the piston 413 is provided with means for automatically cushioning the movement of the piston as it approaches the end of its stroke as shown, see Figs. 12, 13 and 14. The admission of pressure air to the cylinder 414 through ports 424 and 425 is controlled by the position of the piston 423 in the valve casing 422 whereby to establish communication from the source M of pressure air and channels 424 and 425. The channels 424 and 425 in the body of the cylinder 414 communicate with channels 433 and 433ª in the end heads thereof, the latter being provided with check valve 434 (see Fig. 14) for the admission of air to the interior of the cylinder but preventing exhaust back through the channel 433. The exhausting of air from the end of the cylinder head of the piston during its movement is permitted by a plurality of exhaust ports 435 establishing communication between the interior of the cylinder and the channels 424 and 425, and spaced apart lengthwise of the cylinder, so that as the piston 413 approaches the end of its stroke, it progressively covers up these exhaust ports and progressively decreases the area of exhaust opening. Advantageously some of these exhaust ports 435 may be variably adjusted by means of needles 436 so that the exhaust may be throttled to check the movement of the piston as desired.

Viewing the mold carrier motor 414 as shown in Figs. 12 and 13, it may be apparent that as the piston 413 moves to the left, the air in the cylinder will exhaust freely through the exhaust ports 435 through channel 425 and communicating exhaust port of valve 422. Obviously the air ahead of the piston cannot exhaust back through the inlet channel 433ª in the end head because the check valve 434 in said channel is seated against flow of air therein in that direction. As the piston approaches the end of its stroke, it moves past the nearest exhaust opening 435 so that further exhaust may be checked or throttled through adjustable ports nearest the end of the cylinder.

This checking of the exhaust from the cylinder slows up the movement of the piston. Obviously as the piston moves past the second and last exhaust port, the exhaust is further checked and movement of the piston is effectively cushioned, and the air trap between the last exhaust port 435 and the adjacent end of the cylinder is permitted to bleed through a bleeding port 437 (see Fig. 14) provided with a needle valve 438 to variably control the rate of bleeding of air from said cylinder. Obviously in the above described arrangement wherein each stroke of the piston is a mold moving stroke, the adjustable devices described above are duplicated at opposite ends of the cylinder 414.

The above described cushioning of the mold carried turning piston 413 is highly advantageous in glass forming machines, particularly so in my present machine wherein the parison is exposed supported by the neck mold during final movement of the mold to the transfer position D. Such cushioning of the piston 413 brings the molds to a gradual stop and prevents swinging and distortion of the parison which would occur if the piston 413 were permitted to slam against the opposite ends of its cylinder 414.

*Timing and automatic control of the machine*

As stated above, the main air control valve 432 (see Figs. 6 and 7) is mounted on the bed frame of the machine and is adapted to be actuated at the ends of opposite strokes of the table actuator by means of arms 440 on the yoke members 411 to control the admission of pressure air from the pressure air line M through said valve 432 to lines 441 and 442 connected respectively with the upper and lower ends of the fluid pressure motor 417 for shifting the piston 415 and pinion 408. As shown in the diagrammatic view (Fig. 29) the mold carrier actuator is at the end of its stroke causing one of the arms 440 to engage the stem of the valve 432 and shift the valve to the right, placing main pressure air on line 442 and in the lower end of the cylinder 417, raising the pinion 408 into engagement with the high rack 409, the actuator being then in readiness for the next turning stroke of the carrier, being at the right hand end of the cylinder 414. Shifting the pinion 408 vertically into engagement with the rack 409, moves a lever 427 connected thereto for actuating the indexing valve 426, the stem 426ª of which is pivotally connected to the lever, as at 426ᵇ and admits pressure air from the primary valve 443. The primary valve 443 may be of any suitable type, adapted to deliver air to two separate control lines 444 and 445. In the illustrated form, the primary valve 443 is of the fluid pressure operated piston type, comprising a piston valve stem 446 working in a closed valve casing. The air line 447 which receives air from any suitable source of predetermined periodic flow, such as a feeder timer (not shown), is connected to one end of the primary valve casing to shift the valve stem 446 to the left as viewed in Fig. 29 and to admit pressure air from port M of said valve through line 445 to the indexing valve 426 and through the indexing valve alternately through lines 430 and 431 leading to the opposite end of a cylinder valve casing 423 depending upon the position of the indexing valve. As viewed in Fig. 29 the piston 415 having been operated to raise the pinion 408 into engagement with the high rack 409 and the indexing valve lowered, air pressure is on in line 431 to shift the cylinder valve stem 423 to the left and direct the flow of pressure air through port 424 to the right hand end of the cylinder 414. Actuation of the primary valve 443 as above described, to direct air flow to line 445, also permits the simultaneous flow of air through branch line 445ª and its branch line 445ᵇ to actuate the funnel guide piston 378 and the closure motor 127 to simultaneously swing the funnel guide 375 out of position over the mold and bring the closure 110 into closed position over the cavity in the parison mold 14.

The shifting of the main control valve 432 at the end of each stroke of the rack yoke 411 as described above to permit the air flow through line 442 also supplies air to actuate the take-out or ware gripper motors 310 and conveyor piston 450, working in cylinder 451, these motors with the mold carrier motors 417 and 414 making a single or one-way movement for every turning cycle of the machine.

Some of the fluid pressure motors of the machine, for example, the fluid pressure motor 92 for operating the suction valve to supply suction to the parison mold at the charging station, the fluid pressure motor 164 for disengaging the neck molds from the parison at the transfer station, and the fluid pressure motor 212 for effecting final closing movement of the finishing molds at the transfer station, and the opening of the finishing mold at the take-out station, must make a complete cycle of movement during each cycle of movement of the mold carriers so as to be in their reset position as the cooperative molds are brought into position for actuation thereby, and as the parts are actuated upon the completing rotation movement of the mold carrier, they may advantageously be controlled by the main control valve 432 and resetting valve 460 to reset them during the succeeding rotative movement of the mold.

One form of resetting valve suitable for this purpose is illustrated in Fig. 15 and may be of the rotary type comprising a valve casing having a rotatably mounted valve stem 461 therein and carrying a series of rollers 462. The resetting valve is suitably supported in a convenient position on the machine as by means of a bracket 463 (see Fig. 6) adapted to be attached to the base in position to be actuated by one of a series of webs 464 of a mold carrier, preferably the parison mold 10. The valve casing (Figs. 15 and 29) is provided with a plurality of inlets 465 and 466 adapted to be supplied with pressure air from lines 441 and 442 respectively, controlled by the main air valve 432, and is further provided with a pair of oppositely disposed outlet ports 467 and 468, the port 467 supplying air to line 469 (Fig. 29) leading to the forward end of the neck ring releasing cylinder 164 to effect resetting of the piston therein and to the forward end of the blow mold closing cylinder 212 to effect resetting of the piston therein. The outlet port 468 of the valve casing supplies air to the line 470 leading to the opposite ends of the respective cylinders 164 and 212 to reset these motors. A branch line 471 also leads to a suction cylinder valve 472 having slidable air returned valve stem 473 adapted in its opposed positions to admit pressure air from line 471 to lines 474—475 leading to the rear end and forward end of cylinder 92 (see Fig. 16). The stem 473 has a roller 473ª adapted to be engaged by web 464 to hold the valve 472 open to line 474 when the mold carriers are at rest. With the valve 472 in the position shown in Figs. 16 and 26 it admits air to the rear end of suction valve motor 92 to apply the suction head 90 to the suction air blowing head 64 when the parison mold is standing at the charging station.

The valve stem 461 (see Fig. 15) of the resetting valve is formed with upper and lower transversely formed passages 476 and 477, respectively, disposed at right angles to each other, the passage 476 being adapted to connect the inlet port 465 with the upper end of vertical passage 478 on the opposite wall of the casing and in communication with the outlet 468, and the lower passage 477 being adapted to connect the inlet 466 with the lower end of the passage 478 leading to the outlet 468. The valve stem 461 is further provided with a pair of oppositely disposed lengthwise grooves 479 adapted to connect the inlet port 465 with the outlet port 467, and another pair of grooves 480 adapted to connect the lower inlet port 466 with the outlet port 467.

*Operation*

The operation of the machine is believed to be clear in view of the foregoing description. As the machine completes one of its turning movements and comes to rest presenting an uncharged mold at the charging position, the main air valve 432 (see Fig. 29) is actuated by the arm 440 on the yoke 411 of the reciprocable actuator to supply air pressure in the line 442 to effect the simultaneous operation of the air motor of the take-out device over the mold to grip and lift the ware and the air motor 417 to shift the pinion 408 into engagement with the rack 409, thus shifting indexing valve 426 and resetting piston valve 423 of the cylinder valve 422, all of these parts taking the positions shown in Fig. 26. The air line 442 also admits air through the resetting valve 460 to the line 470 to actuate the motor 164 to release the neck rings from the parison at the transfer station and the motor 212 to close the blow molds around the parison as the neck rings are released. As the mold moves into position, the web 464 on the blank mold engages valve stem 473 of the suction cylinder valve 472 and moves it rearwardly so that air through line 470—471 will flow through line 474 to the rear end of suction valve cylinder 92 and apply the suction valve head to the suction inlet of the combined suction and blow head 64 of each parison mold. The feeding device F is preferably timed so as to form and deliver a charge of glass simultaneously as a blank mold is brought into the charging position;
and as suction is applied in the neck mold cavity and parison mold cavities at the time of delivery of the charge thereto, the glass is quickly drawn down into the neck end of the mold to form the mouth finish around the mouth forming pin 67.
Synchronously with the delivery of the charge of glass to the mold, the timing valve of the glass feeding mechanism delivers air under pressure through line 447 to actuate the primary valve and move it to the left (see Fig. 29), this movement of the primary valve permitting main pressure air to pass from line M of said valve to line 445 effecting the simultaneous operation of motor 378 to bring the funnel guide out of axial position over the mold, motor 127 to swing baffle plate 110 over the mold, and the supply of air to the indexing valve 426 whereby air may flow through line 431 to shift valve 423 to the left and admit pressure air from port M of valve casing 422 through passage 424 and the right hand end of cylinder 414, thus moving piston 413 to the left and rotating the mold carriers through the next succeeding cycle. During movement of the mold carriers the rotary stem 461 of the resetting valve 460 is engaged by the web 464 and turned one quarter revolution to admit pressure air through line 469 to reset the primary valve 443 the neck pin releasing motor 164 and blow mold closing motor 212.

After the parison mold has received its charge of glass at the charging station and the mouth finish of the bottle has been formed therein by suction applied around the neck mold cavity and mouth forming pin, the mold is immediately moved to the next station. As stated above, the baffle plate 110 has been applied to close the upper end of the parison while the mold is still at the charging position and as the mold moves away from the position, the roller 128 rides under cam 129 and securely holds the baffle plate in closed position on the mold. As the mold moves away from the charging position, the pin 68ᵃ on the neck pin 66 engages in the cam trackway 85 and is withdrawn from closed position in the neck mold cavity permitting air under pressure from the distributing valve 140 to be admitted to the neck mold cavity through passages 136 and 137 to admit air under pressure to the mouth end of the parison and expand it to hollow form while confined within the parison mold. The length and duration of this parison blow may be suitably controlled to suit the character of the ware being made by adjustment of the stop pins 156ᵇ and 156ᶜ in the support. Preferably this is maintained until after the charged parison mold leaves the second station B. As the parison mold leaves station B, the roller 55 on the mold locking pin 51 engages cam 56 and withdraws the locking pin 51 from engagement with the seat 54 permitting the mold support 24 to be inverted upon engagement of the gears 41 with rack 42 so that the molds are inverted into neck end up position during movement thereof from station B to station C.

Upon leaving station C the roller 33ᵃ of the blank mold yokes 29 rolls on trackway 38 of cam 34 opening the molds during movement to station D and permitting the parison to be supported by the closed neck ring. During this movement to station D the parisons are moved in a path convergent with the path of the moving blow molds which are gradually closed around the parison so that on arrival at the station D the parisons are supported by the neck molds and are almost completely embraced by the blow or finishing molds. During this stop period, as the neck mold opening cylinder 164 and the blow mold closing cylinder 212 are operated by the primary valve 432 as above described, the neck mold opening cylinder is timed to operate slightly in advance of the blow mold closing cylinder so as to avoid checking the neck of the ware.

During movement of the blow mold with the parison in it from station D to station E, the blow head is lowered on the mold by reason of the lever 248 controlled by cam 255. At the proper time when the parison has been permitted to attain a uniform temperature throughout and to reheat the chilled skin formed by contact with the parison mold, which may be adjustably controlled by the positioning of the valve 270 in support 271, the roller 286 on the valve 270 engages the cam trackway 285 and 287 to open the valve and admit pressure blowing air to the parison within the blow mold according to the volume and pressure desired (see Figs. 2 and 4). This final blowing of the bottle may be continued for such time as desired during movement of the mold to the discharge station, depending upon the setting of the clamp arm 291, and preferably is maintained during the maximum time permitted by such mold movement so as to adequately set and cool the bottle to self-supporting form.

As the blow mold with the blown bottle in it approaches the discharge or take-out station H (Fig. 2) the mold is gradually opened by reason of engagement of the roller 206 on a relieved portion of cam 208 so that the neck of the ware is fully exposed for engagement by the ware-gripping members 310. As the ware-gripping members grip the ware, the mold is moved to full open position by reason of the bell crank lever 296 actuated by the blow mold closing cylinder 212 (see Fig. 5) so that on the next movement of the mold carriers the take-out mechanism may be rotated in synchronism therewith to remove the ware and deposit it on the conveyor.

Advantages of my invention reside in the simplicity and strength of construction of the machine, the automatic features and variable control and the speed with which it may be operated for producing superior ware. The molds need be stopped at the charging position sufficiently long only to receive their charge and being stationary at the time of receiving the charge and the forming of the finish, the glass charge is quickly drawn into the neck mold for the prompt and immediate formation of the mouth finish of the article, thus avoiding the objection common in charging of moving molds of chilling the glass by its contact with the advancing side of the mold. The immediate fabrication of the parison into its desired shape following the charging thereof is highly advantageous as it permits of the working of the glass in its most desirable condition and the production of more perfect ware. The individual adjustments for the blowing mechanism for each set of molds, both for the fabrication of the parison and the blowing of the article to final form, permit setting of the machine to suit the particular individual characteristics of the parisons and bottles formed in each set of molds.

Obviously my invention is not restricted to the details of construction or form of machine as shown and described herein, these being intended merely for illustrative purposes.

I claim:

1. A glassware forming machine, a series of invertible parison molds and associated neck rings, a movable carrier on which said parison and neck molds are fixedly mounted, means for intermittently moving said carrier to move said molds in quick succession to provide relatively brief and momentary stop periods of substantially less duration than intervening mold movements, means mounted on the parison mold carrier in fixed relation to the parison and neck molds for shaping charges of glass in said molds during movement thereof, means for inverting the parisons and transferring them to the finishing molds, a series of finishing molds, and means for blowing the articles to final form in the finishing molds.

2. A glassware forming machine, a series of invertible parison molds and associated neck molds, a movable carrier on which said parison and neck molds are fixedly mounted, means for intermittently moving said carrier to move said molds in quick succession to and from a stationary mold charging position and to provide relatively brief and momentary stop periods of substantially less duration than intervening mold movements, means for supplying said parison mold with glass during stop periods of the molds, means mounted on the parison mold carrier in fixed relation to the parison and neck molds for shaping charges of glass in said molds during movement thereof, means for inverting the parisons and transferring them to the finishing molds, a series of finishing molds, and means for blowing the articles to final form in the finishing molds.

3. A glassware forming machine, a series of invertible parison molds and associated neck molds, a movable carrier on which said parison and neck molds are fixedly mounted, means for intermittently moving said carrier to move said molds in quick succession to and from stationary parison mold charging and parison transferring positions and to provide relatively brief and momentary stop periods of substantially less duration than intervening mold movements, means for supplying said parison molds with glass charges during stop periods of the molds, means mounted on the parison mold carrier in fixed relation to the parison and neck molds for shaping charges of glass in said molds during movement thereof, means for inverting the parisons and transferring them to the finishing molds, a series of finishing molds, and means for blowing the articles to final form in the finishing molds.

4. A glassware forming machine, a series of invertible parison molds and associated neck molds, a movable carrier on which said parison and neck molds are fixedly mounted, fluid pressure operated power means for intermittently moving said carrier, to move said molds in quick succession to provide relatively brief and momentary stop periods of substantially less duration than intervening mold movements, means mounted on the parison mold carrier in fixed relation to the parison and neck molds for shaping charges of glass in said molds during movement thereof, means for inverting the parisons and transferring them to the finishing molds, a series of finishing molds, and means for blowing the articles to final form in the finishing molds.

5. In a glassware forming machine a movable mold carrier, a plurality of glass-shaping molds supported on said carrier, means to cooperate with said molds to shape the glass therein, means for moving said carrier intermittently, and a reciprocatory member for actuating said carrier moving means arranged to rotate said carrier during each reciprocation thereof.

6. In a glassware forming machine a movable mold carrier, a plurality of glass-shaping molds supported on said carrier, means to cooperate with said molds to shape the glass therein, means for successively delivering charges of glass to said molds while said molds are stationary, means to actuate said glass-shaping means to cooperate with said molds during movement thereof, means for moving said carrier intermittently, and a reciprocatory member for actuating said carrier moving means arranged to rotate said carrier during each reciprocation thereof.

7. In a glassware forming machine a movable mold carrier, a plurality of glass-shaping molds supported on said carrier, means to cooperate with said molds to shape the glass therein, means for successively delivering and compacting charges of glass to said molds while said molds are stationary, means to actuate said glass-shaping means to cooperate with said molds during movement thereof, means for moving said carrier intermittently, and a reciprocatory member for actuating said carrier moving means arranged to rotate said carrier during each reciprocation thereof.

8. In a glassware forming machine a movable mold carrier, a plurality of glass-shaping molds supported on said carrier, means including glass blowing mechanism arranged to cooperate with said molds to shape the glass therein, means for successively delivering charges of glass to said molds while said molds are stationary, means to actuate said glass-shaping means to cooperate with said molds during movement thereof, means for moving said carrier intermittently, and a reciprocatory member for actuating said carrier moving means arranged to rotate said carrier during each reciprocation thereof.

9. In a glassware forming machine, a movable mold carrier, a plurality of glass-shaping molds supported on said carrier, means to cooperate with said molds to shape the glass therein, and means for intermittently moving said carrier, comprising a gear member for effecting carrier rotation, a reciprocatory member having oppositely disposed racks, one on each side of said gear member, and means for effecting relative shifting movement between said gear member and racks for engaging them alternately whereby opposite reciprocations of said reciprocatory member will effect unidirectional rotation of said gear member and carrier.

10. In a glassware forming machine, a movable mold carrier, a plurality of glass-shaping molds supported on said carrier, means to cooperate with said molds to shape the glass therein, and means for intermittently moving said carrier, comprising a gear member for effecting carrier rotation, a double rack having oppositely disposed arms adapted for alternate meshing engagement with said gear, means for effecting meshing engagement between each of said racks alternately with said gear whereby opposite reciprocation of said rack member will effect unidirectional rotation of said carrrier, and fluid pressure means for operating said rack member.

11. In a glassware forming machine, a movable mold carrier, a plurality of glass-shaping molds supported on said carrier, means to cooperate with said molds to shape the glass therein, and means for intermittently moving said carrier, comprising a gear member for effecting carrier rotation, a double rack having oppositely disposed arms adapted for alternate meshing engagement with said gear, means for shifting said gear into mesh with each of said racks alternately whereby opposite reciprocation of said rack member will effect unidirectional rotation of said carrier, and fluid pressure means for operating said rack member.

12. In a glassware forming machine, a series of glass-shaping molds movably mounted, means for shaping the glass charges in the molds during movement thereof, and reciprocating fluid pressure operated means for intermittently moving said molds in quick succession during opposite strokes of said reciprocating means.

13. In a glassware forming machine a series of molds movably mounted, means for shaping the glass charge in the molds during movement thereof, gearing for rotating said molds, and a fluid pressure operated reciprocable rack mechanism associated with said gearing and operative during opposite strokes thereof to effect quickly succeeding movement of said molds.

14. In a glassware forming machine a series of molds movably mounted, means for shaping the glass charges in the molds during movement thereof, gearing for rotating said molds, and fluid pressure operated reciprocable rack members opposed to each other and arranged to be alternately engaged with said gearing whereby rotation of said molds is effected during opposite strokes of the reciprocable racks and means for alternately engaging the gearing with said racks.

15. In a glassware forming machine a series of molds movably mounted, means for shaping the glass charges in the molds during movement thereof, gearing for rotating said molds, and including a driving pinion, opposed rack members on opposite sides of said pinion arranged for alternate engagement therewith, means for effecting alternate engagement between said pinion and the respective rack members, whereby rotation of molds is effected during each stroke of said rack members, and means for moving said rack members in unison.

16. In a glassware forming machine a series of molds movably mounted, means for shaping glass charges in said molds during movement thereof, gearing for rotating said molds including a driving gear unit, and fluid pressure operated reciprocable rack members arranged to be alternately engaged with said driving gear unit whereby rotation of said molds is effected during opposite strokes of said reciprocable racks, said driving gear unit being insertible in and removable from the machine without disturbing the rack members or molds and means for alternately engaging the gearing with said racks.

17. In a glassware forming machine a series of molds movably mounted, means for shaping the glass charges in the molds during movement thereof, gearing for rotating said molds, and including a driving pinion, opposed rack members on opposite sides of said pinion arranged for alternate engagement therewith, means for effecting alternate engagement between said pinion and respective rack members, whereby rotation of molds is effected during each stroke of said rack members, and means for moving said rack members in unison, said driving pinion being insertible in and removable from the machine as a unit independently of the rack members.

18. In a glassware forming machine, a series of molds, a movable support therefor, glass shaping devices adapted to cooperate with said molds to shape the glass charges therein, a gear member carried by said support for imparting rotative movement thereto, a reciprocable primary actuator including a pair of opposed rack members, and means for establishing an operative driving connection alternately between the respective rack members and gear members, said means being insertible in and removable from the machine as a unit independently of the rack bars or gear member.

19. In a glassware forming machine, a series of molds, a rotatable support therefor, glass shaping devices adapted to cooperate with said molds to shape the glass charges therein, a gear member carried by said support for imparting intermittent rotative movements thereto, a fluid pressure operated actuator including oppositely disposed reciprocable rack members and a driving unit between said gear member and rack members comprising a driving gear for cooperation with said gear member, a pinion for coaction alternately with said respective rack members, means for shifting said driving unit to establish driving connections between said pinion and respective rack members.

20. In a glassware forming machine, a series of molds, a rotatable support therefor, glass shaping devices adapted to cooperate with said molds to shape the glass charges therein, a gear member carried by said support for imparting intermittent rotative movements thereto, a fluid pressure operated actuator including oppositely disposed reciprocable rack members and a vertically shiftable driving unit between said gear member and rack members comprising a driving gear for cooperation with said gear member, a pinion for coaction alternately with said respective rack members, means for shifting said driving unit to establish driving connections between said pinion and respective rack members and counterbalancing means for the driving means.

21. In a glassware forming machine, a circular series of molds, a rotatable support for said molds, fluid pressure operated means for rotating said support intermittently in quick succession on opposite strokes thereof, valve means arranged to be actuated on opposite strokes of the fluid pressure operated means, an indexing valve arranged to control the admission of fluid pressure for actuating the fluid pressure operated means at the end of each movement thereof and means connected by the first named valve means and the indexing valve to control admission of fluid pressure to said fluid pressure operating means to move it alternately in opposite directions.

22. In a glassware forming machine, a circular series of molds, a rotatable support for said molds, fluid pressure operated means including a cylinder and reciprocable piston therein for rotating said support intermittently, a valve for controlling the admission of air to opposite ends of said cylinder, air supply valve means arranged to be operated on opposite strokes of said piston, an indexing valve for controlling said cylinder valve in its movement in both directions, and pneumatically operated means controlled by said air supply valve for actuating said indexing valve.

23. In a glassware forming machine, a circular series of molds, a rotatable table therefor, gearing for rotating said table intermittently in quick succession providing brief resting period between turning periods of greater duration, a fluid pressure operated reciprocable actuator for said gearing arranged to rotate said mold table during opposite strokes thereof, a pneumatically operated valve therefor, a main air valve arranged to be actuated on opposite strokes of the table drive, and a pneumatically operated indexing valve controlled by said main air valve for directly controlling said actuator valve and effect reverse movement of said actuator.

24. In a glassware forming machine, a circular series of molds, a rotatable support therefor, gearing for rotating said support intermittently in quick succession providing brief resting periods between turning periods of greater duration, a fluid pressure operated reciprocable actuator for said gearing arranged to rotate said mold support during opposite reciprocations thereof, valve means arranged to be shifted at the ends of opposite strokes of the actuator, and a pneumatically operated secondary valve controlled by said first named valve for controlling the admission of fluid pressure to said actuator to effect quick reversal thereof and shorten the period of rest of said support.

25. In a glassware forming machine, a circular series of molds, a rotatable support therefor, a fluid pressure operated reciprocable actuator arranged to rotate said mold support during opposite reciprocations thereof to impart to said mold support quickly recurring intermittent movements intervened by stop periods of less duration, gearing for converting reciprocative movements of said actuator into rotative movements to the mold support and including a vertical shiftable element, valve means arranged to be actuated on opposite strokes of said actuator for controlling said shiftable element, and valve means controlled by movement of said first named valve means for controlling the admission of fluid pressure to said actuator to move it in the reverse direction.

26. An organized glassware forming machine comprising a series of invertible parison molds adapted to be presented in succession to a charging position and a transferring position, a suction applying device located at the charging position and arranged to cooperate with said parison molds as they are successively brought to and halted at the charging position for applying suction in the parison mold cavity to compact the charge therein, devices individual to each of said molds for shaping the charges therein during movement thereof from the charging position to the transfer position, a series of finishing molds adapted to be presented in succession to the transferring position and the discharging position, devices for shaping the glass articles to the finished form therein during movement thereof from the transferring to the discharging stations, and means for intermittently moving said molds in cycles of definite duration corresponding to the productive speed of the machine and characterized by providing a brief mold resting period during which carging of the parison mold and transfer of the parison take place, the mold resting periods being of substantially less duration than the mold moving period.

27. An organized glassware forming machine comprising a series of invertible parison molds adapted to be presented in succession to a charging position and a transferring position, means stationarily mounted at the charging position and arranged to cooperate successively with the parison molds as they are successively brought to the charging position to apply fluid pressure differential in the opposite ends of the parison mold to compact the charge therein, devices individual to each of said molds for shaping the charges therein during movement thereof from the charging position to the transfer position, a series of finishing molds adapted to be presented in succession to the transferring position and the discharging position, devices for shaping the glass articles to the finished form therein during movement thereof from the transferring to the discharging stations, and means for intermittently moving said molds in cycles of definite duration corresponding to the productive speed of the machine and characterized by providing a brief mold resting period during which charging of the parison mold and transfer of the parison takes place, the mold resting period being of substantially less duration than the mold moving period.

28. An organized glassware forming machine comprising a series of movable parison molds adapted to be presented in succession to a charging position and a transferring position, devices individual to each of said molds for initially shaping the charges therein during movement thereof from the charging position to the transfer position, a series of finishing molds adapted to be presented in succession to the transferring position and the discharging position, devices for shaping the glass articles to their finished form therein during movement thereof from the transferring to the discharging stations, and fluid pressure operated means comprising a driving gear and opposed rack members arranged to rotate said gear during opposite strokes of the rack members for intermittently moving said molds in cycles of definite duration corresponding to the production speed of the machine and characterized by providing a mold resting period during which charging of the parison mold and transfer of the parison takes place, the mold resting period being of substantially less duration than the mold moving period.

29. In a glassware forming machine, a series of parison molds movably mounted to be presented in succession at charging and transferring positions, a suction applying device located at the charging position and arranged to cooperate with said parison molds as they are successively brought to and halted at the charging position for applying suction in the parison mold cavity to compact the charge therein, devices individual to said molds for shaping the glass charges therein and fluid pressure means for moving said molds, comprising means to halt said molds sufficiently long to permit the charging of the mold and then immediately moving the mold from said charging position, said halting period of the molds being of substantially less duration than the moving period during which shaping of the glass takes place.

30. An organized glassware forming machine comprising a series of movable parison molds adapted to be presented in succession to a charging position and a transferring position, devices individual to each of said molds for initially shaping the charges therein during movement thereof from the charging position to the transfer position, a series of finishing molds adapted to be presented in succession to the transferring position and the discharging position, devices for shaping the glass articles to the finished form therein during movement thereof from the transferring to the discharging stations, and means comprising a driving gear and opposed fluid pressure operated racks arranged to rotate said gear during their opposite strokes for intermittently moving said molds in cycles of definite duration corresponding to the production speed of the machine and characterized by providing a mold resting period of substantially less duration than the mold moving period.

31. In a glassware forming machine, a series of parison molds movably mounted to be presented in succession at charging and transferring positions, devices individual to said molds for shaping the glass charges therein, a fluid pressure operated driving and indexing gear operable in each of its movements to halt said molds sufficiently long to permit the charging of the mold and then immediately moving the mold from said charging position, said halting period of the molds being of substantially less duration than the moving period during which shaping of the glass takes place, and means controlled by said driving and indexing gear for applying fluid pressure differential in opposite ends of the parison molds at the charging position to compact the charges therein.

32. A glassware forming machine comprising cooperating pairs of blank and blow molds, revoluble means for mounting said molds, means for intermittently rotating said revoluble means comprising a reciprocable actuating member, and connections between said actuating member and said revoluble mounting means for rotating the latter during each movement of said actuator.

33. In a glassware forming machine, a series of cooperating parison and blow molds, means for intermittently moving said molds to present said parison molds successively to charging and transferring positions and the blow molds to transferring and discharging positions, a fluid pressure operated reciprocable actuator arranged to effect movement of said molds during its opposite strokes, main valve means arranged to be actuated on opposite strokes of said actuator, a pneumatically operated valve controlled by said main valve for controlling the supply of fluid pressure to said actuator for movement in both directions, a plurality of stationary fluid pressure operated devices arranged to cooperate with said molds and operative in one direction to effect charging and transferring and valve means for resetting said devices during each succeeding step of rotation of said molds.

34. In a glassware forming machine, a series of cooperating parison and blow molds, means for intermittently moving said molds to present said parison molds successively to charging and transferring positions and the blow molds to transferring and discharging positions, a fluid pressure operated reciprocable actuator arranged to effect movement of said molds during its opposite strokes, main valve means arranged to be actuated on opposite strokes of said actuator, a pneumatically operated valve controlled by said main valve for controlling the supply of fluid pressure to said actuator for movement in both directions, a plurality of stationary fluid pressure operated devices arranged to cooperate with said molds and operative in one direction during stop periods of the machine to effect charging and transferring and valve means controlled by movement of the mold support for effecting a resetting of said devices during each successive step of rotation of said molds.

35. Glassware forming machinery comprising a series of cooperating parison and blow molds, means for intermittently moving said parison molds successively to charging and transferring position and the blow molds successively to transferring and discharging positions, a reciprocable actuator arranged to effect movement of the molds during its opposite strokes to provide momentary stop periods between turning periods of longer duration, main valve means arranged to be actuated on opposite strokes of said actuator, a plurality of stationary fluid pressure operated devices arranged to cooperate with said molds and controlled by said main valve to operate in one direction to effect charging of the parison molds, and transferring of the parison to the blow mold, and valve means for resetting said devices during each succeeding step of rotation of said molds.

36. Glassware forming machinery comprising a series of cooperating parison and blow molds, means for intermittently moving said parison molds successively to charging and transferring positions and blow molds successively to transferring and discharging position, a reciprocable actuator arranged to effect movement of the molds during its opposite strokes to provide momentary stop periods between turning periods of longer duration, main valve means arranged to be actuated on opposite strokes of said actuator, a fluid pressure operated means at the charging position arranged to cooperate with said parison molds as they are successively brought to the charging position, to establish a fluid pressure differential on opposite ends of the glass charge to compact the same in the parison mold, connections between said main valve and fluid pressure operated means whereby said main valve controls actuation of said fluid pressure operated means in one direction to effect compacting of the charge, and valve means for resetting said fluid pressure operated means during each succeeding step of rotation of said molds.

37. Glassware forming machinery comprising a series of cooperating separable parison and neck molds, a series of separable blow molds, means for intermittently moving said molds successively to a transferring position where glass parisons are transferred from the parison and neck molds to the blow molds, a reciprocable actuator arranged to effect movement of the molds, a main valve arranged to be actuated by the actuator at the end of each stroke thereof, fluid pressure operated devices stationarily mounted on the machine adjacent to the transfer position and arranged to be actuated in one direction by air controlled from said main valve, to close the blow molds and open said neck molds, and valve means for resetting said devices during each succeeding step of rotation of said molds.

38. Glassware forming machinery comprising a series of cooperating separable parison and neck molds, a series of separable blow molds, means for intermittently moving said molds successively to a transferring position where glass parisons are transferred from the parison and neck molds to the blow molds, a reciprocable actuator arranged to effect movement of the molds, a main valve arranged to be actuated by the actuator at the end of each stroke thereof, a fluid pressure operated device mounted on the machine adjacent the transfer position and arranged to be moved in its actuating direction to close the blow molds, another fluid pressure device mounted on the machine adjacent the transfer position and arranged to be moved in its actuating direction to open said neck molds, connections between said main valve and said devices for automatically operating said devices in actuating directions at the conclusion of moving periods of said molds, and valve means for resetting said devices during each succeeding movement of said molds.

39. In a glassware forming machine a base having an elongated recess in the upper part thereof constituting a lubricant reservoir, laterally spaced mold carrier columns mounted in said recess and fixedly secured to said base, a mold carrier rotatably mounted on each of said columns and having a gear on the lower end thereof adapted to be positioned within said recess and to run in the lubricant therein, interconnecting gears journalled in said base within said recess and meshing with the gears in the lower end of said mold supports for effecting rotation of said supports in unison, a supporting bearing for each of said interconnecting gears, each of said gears and its supporting bearing being insertible in and removable from the machine as a unit.

40. The combination set forth in claim 39 in which each interconnecting gear and its supporting bearing is formed as a unit and comprises a stub shaft on the gear journalled in said supporting bearing, and anti-friction bearing means between said bearing and gear.

41. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, stationary cam means for controlling the position of the mouth pin comprising a support, a cam member carried thereby, means for adjusting the position of said cam and support in the direction of movement of said molds, and means operative after the withdrawal of the mouth pin for admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in opened condition in a path approaching a transfer position in the same direction as the exposed moving parison, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

42. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, stationary cam means for controlling the position of the mouth pin comprising a support, a cam member resiliently carried thereby, and means for adjusting the position of said cam and support in the direction of movement of said molds, means operative after withdrawal of the mouth pin for admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in opened condition in a path approaching a transfer position in the same direction as the exposed moving parison, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

43. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouth forming pin to form the mouth end of the bottle throughout a definite predetermined time interval and during movement of the mold, stationary cam means for controlling the position of the mouth pin comprising a support, a cam member carried thereby, resilient means adjustably mounted between said support and cam member, and means for variably adjusting the position of said cam member to vary the positioning and withdrawal of the mouthforming pin mechanism independently of the speed of movement of said molds, means operable after the withdrawal of the mouth pin for admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in opened condition in a path approaching a transfer position in the same direction as the exposed moving parison, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

44. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, a closure for the upper end of the mold normally laterally removed from the axis of the mold, means for delivering a charge of glass to the mold while the mold is at rest at the charging position, means for moving said closure laterally over the mold as the charge is delivered into the mold, and stationary cam means having a vertical cam surface adapted to be engaged by said closure for holding it axially of the mold during movement thereof, a resiliently supported horizontally disposed cam surface adapted to be engaged by said closure for holding said closure against said mold, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in opened condition in a path approaching a transfer position in the same direction as the exposed moving parison, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

45. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, a closure for the upper end of the mold normally laterally removed from the axis of the mold, fluid pressure means for moving said closure laterally over the mold as the charge is delivered into the mold, stationary cam means adapted to be engaged by said closure for maintaining said closure axially of the mold and tightly in engagement therewith during a period of movement of said mold, equal at least to the spacing between said molds, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in opened condition in a path approaching a transfer position in the same direction as the exposed moving parison, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

46. In a glassware forming machine, a circular series of parison molds, a support therefor, means for rotating said support, mouth pin mechanism adapted to close the mouth ends of the parison molds when the charges are placed therein, means for closing the opposite end of the parison mold, and simultaneously admitting air under pressure to that end of the charge to compact the glass around the mouth pin and form the mouth finish of the article, means for thereafter admitting air under pressure to the mouth end of said parison to blow it to hollow form while confined in the parison mold, a single distributing valve for controlling said compacting and parison blowing pressure, and means for variably controlling the actuation of said valve to vary duration of the compacting blowing and the commencement and duration of the parison counterblowing independently of each other.

47. A glassware forming machine, a series of invertible parison molds and associated neck molds, a movable carrier on which said parison and neck molds are fixedly mounted, means for intermittently moving said carrier to move said molds in quick succession to provide relatively brief and momentary stop periods of substantially less duration than intervening mold movements, a mouthforming pin arranged to close the neck end of the parison mold cavity as the glass charges are delivered thereto, means for applying suction axially in the neck mold cavity and laterally throughout a substantial part of the parison mold cavity to compact the glass in the parison and neck mold, means operative thereafter to admit air under pressure to the neck end of the packed charge while excluding air from the parison mold cavity to expand the charge to hollow form in the parison molds during movement thereof, means for inverting the parisons and transferring them to the finishing molds, a series of finishing molds, and means for blowing the articles to final form in the finishing molds.

48. A glassware forming machine, a series of invertible parison molds and associated neck molds, a movable carrier on which said parison and neck molds are fixedly mounted, means for intermittently moving said carrier to move said molds in quick succession to provide relatively brief and momentary stop periods of substantially less duration than intervening mold movements, a combined suction and blowing head mounted on said parison mold carrier one for each set of parison and neck molds and permanently associated with said neck molds, a mouthforming pin mechanism mounted on and rigidly connected to said suction and blowing head, means for admitting air to said head and axially in the neck mold cavity to expand a charge of glass to hollow form in the parison mold during movement thereof, means for inverting the parisons and transferring them to the finishing molds, a series of finishing molds, and means for blowing the articles to final form in the finishing molds.

49. In a glassware forming machine, a series of molds, a support therefor movably mounted and self-locking driving means for moving said molds intermittently comprising a rotatable pinion having driving connections with said mold support, and a reciprocable actuator for said pinion having opposed racks for alternate engagement with said pinion, and means for effecting relative shifting of said rack members and pinion while maintaining a constant meshing relation between said pinion with one or both of said racks.

50. In a glassware forming machine, in combination with a charge feeding device, of a rotatable mold carrier, a series of parison molds mounted upon said mold carrier and adapted to be moved in inverted position successively to a charging position, individual mouth forming pin mechanism arranged to close the mouth end of the parison mold cavities, a closure for the upper end of the mold normally laterally removed from the axis of the mold, means automatically controlled by the operation of the charge feeding device for moving said closure laterally over the mold, as the charge is delivered, and stationary cam means adapted to be engaged by said closure after it is applied to the mold for maintaining said closure axially of the mold and tightly in engagement therewith during a period of movement of said mold.

51. In a glassware forming machine, in combination with a charge feeding device, of a rotatable mold carrier, a series of parison molds mounted upon said mold carrier and adapted to be moved in inverted position successively to a charging position, individual mouthforming pin mechanism arranged to close the mouth end of the parison mold cavities, a closure for the upper end of the mold normally laterally removed from the axis of the mold, means automatically controlled by the operation of the charge feeding device, for moving said closure laterally over the mold, as the charge is delivered, and stationary cam means adapted to be engaged by said closure for maintaining said closure axially of the mold and resiliently urging it in engagement therewith during a period of movement of said mold.

52. A glassware forming machine comprising a series of parison molds, rotatably mounted means for moving said molds to present successive molds in an inverted position at a charging station and in an upright position at a transfer position, a neck mold cooperating with and associated with each of said parison molds, a mouth forming pin cooperating with and associated with each of said parison molds for shaping the mouth finish of the article and forming an initial blow opening therein, means for applying suction in the neck ends of said molds to compact the charge therein, devices individual to said molds for closing the opposite ends of said molds during movement of said molds throughout a distance at least equal to the spacing between said molds, means for admitting fluid under pressure in sufficient volume and pressure through the neck end of the mold to blow the glass therein to hollow form while confined therein, means for disengaging the parison mold from the blown parison while supporting it from the neck end thereof, a series of finishing molds laterally spaced from said parison molds, means for partially closing the finishing molds around successive parisons during movement thereof, means to effect simultaneous final closing of the finishing molds around the parison and release of the supporting means therefrom, and devices individual to said finishing molds for blowing the article to final form therein during movement thereof.

53. In a glassware forming machine, a circular series of parison molds, a circular series of blow molds laterally spaced from said parison molds, and means for intermittently moving said molds, a separate neck mold and mouthforming pin associated with each parison mold, means for supplying glass charges to said parison molds, means for applying differential air pressure on opposite ends of the charge to pack the same in the neck end of the mold and form the mouth and neck end of the article during movement of the mold, closure means for the open end of the mold laterally removed from the axis of the mold but movable to closed position thereon, means for blowing the glass charge in the parison mold to hollow form while confined therein by said closure means to form the parison, means for inverting the parison and neck molds to neck end up position, means for opening the parison mold to expose the parison supported by the neck molds, means for closing the blow mold around the thus supported parison, means for releasing the neck mold from the parison as the blow molds close around it whereby to transfer the parison to the finishing mold, and means individual to each blow mold for blowing the article to final form therein during movement thereof away from the transfer position.

54. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charges in the parison molds during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

55. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for adjustably controlling the withdrawal of the mouthforming pin after the cessation of the compacting of the charge and thereafter admitting air under pressure to the mouth end of the parison to blow it to hollow form while confined in the parison mold and during movement thereof, closure means for said molds for confining the charges in the parison molds during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in open condition in a path approaching the transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

56. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for adjustably controlling the duration of the compacting operation and the withdrawal of the mouthforming pin after the cessation thereof and thereafter admitting air under pressure to the mouth end of the parison to blow it to hollow form while confined in the parison mold and during movement thereof, closure means for said molds for confining the charges in the parison molds during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in open condition in a path approaching a transfer position in the same direction as the exposed moving parison, means for partially closing the finishing mold around the exposed parison as said mold and parison simultaneously approach a transfer position, automatic means to disengage the neck molds from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

57. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charges in the parison molds during the blowing thereof to hollow form, means adjustably varying the commencement of parison blowing following the withdrawal of the mouthforming pin, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

58. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charges in the parison molds during the blowing thereof to hollow form, means for variably controlling the termination of the blowing of the parison to hollow form independently of time of removal of the closure means, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving a finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

59. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for applying suction axially of the parison and neck molds and laterally within the body blank cavity of the parison mold for compacting the charge of glass in the parison mold around the mouthforming pin to form the mouth end of the bottle throughout a definite predetermined time interval, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

60. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for applying suction to the parison and neck mold cavity and thereafter fluid under pressure to the upper end thereof for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position and in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

61. An organized machine for making glass articles, a circular series of parison molds, a rotatable support therefor and means for rotating said support, a circular series of neck molds, means for automatically opening and closing said parison and neck molds, means for automatically delivering charges of molten glass through the upper open end of said parison molds while in inverted position, individual mouthforming pin mechanism for said parison and neck molds, means for applying suction to the parison and neck mold cavity and thereafter fluid under pressure to the upper end thereof for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, said closure means serving also to admit compacting air pressure to the upper end of the glass charge, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position and in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

62. An organized machine for making glass articles, a circular series of parison molds, a rotatable support therefor and means for intermittently moving said support to provide stop periods of very brief and of less duration than the turning periods thereof, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position and in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

63. An organized machine for making glass articles, a circular series of parison molds, a rotatable support therefor and a reciprocable pneumatically operated motor for intermittently moving said support to provide stop periods of very brief and of less duration than the turning periods thereof, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

64. An organized machine for making glass articles, a circular series of parison molds, a rotatable support therefor and means for intermittently moving said support to provide stop periods of very brief and of less duration than the turning periods thereof, a circular series of neck molds, means for automatically opening and closing said parison and neck molds, means for automatically delivering charges of molten glass through the upper open end of said parison molds while in inverted position, individual mouth forming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means to apply the closure means to the upper open end of the mold at the charging position and to maintain said mold closed during movement to and while at the next succeeding stop position, means for rotating the parison molds about a horizontal axis to invert the molds, connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position and in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

65. An organized machine as defined in claim 64 characterized by the provision of fluid pressure operated means for applying the closure to the mold at the charging position and cam means for maintaining said closure upon said mold during movement thereof.

66. An organized machine for making glass articles, a circular series of parison molds, a rotatable support therefor and means for intermittently moving said support to provide stop periods of very brief and of less duration than the turning periods thereof, a circular series of neck molds, means for automatically opening and closing said parison and neck molds, means for automatically delivering charges of molten glass through the upper open end of said parison molds while in inverted position, individual mouthforming pin mechanism for said parison and neck molds, means for establishing fluid pressure differential on opposite ends of the charge for compacting the charge of glass in the parison mold around the mouthforming pin to form the mouth end of the bottle throughout a definite predetermined time interval and during movement of the mold, means for withdrawing the mouthforming pin and thereafter admitting air under pressure to the mouth end of the parison to blow it to hollow form while confined in the parison mold and during movement thereof, closure means for said molds for confining the charge in the parison mold during the blowing thereof to hollow form, means for rotating the parison molds about a horizontal axis to invert the molds, cam actuated connections for automatically opening the parison molds during movement thereof to expose the parisons supported by the neck molds, a circular series of partible finishing molds laterally spaced from said parison molds and movable in substantially the same horizontal plane therewith, means for automatically moving each finishing mold in open condition in a path approaching a transfer position in the same direction as the exposed moving parison, means for partially closing the finishing mold around the exposed parison as said mold and parison simultaneously approach a transfer position, automatic means to disengage the neck mold from the parison whereby to transfer the parison from the parison mold to the finishing mold for movement therein, individual blowing means for each finishing mold for blowing the article to final form therein and means for opening the finishing molds after the final blowing to permit the removal of the articles from the machine.

67. An organized machine for making hollow glass containers and the like comprising a circular series of parison molds, a circular series of blow molds, laterally spaced rotary supports for moving said parison and blow molds in separate non-axial paths toward and from a transfer point common to both paths, a neck mold for cooperation with each parison mold, mouthforming pin mechanism for each neck mold, means presenting said parison molds in succession in inverted position at a charging position, means for delivering a charge of glass to said mold, means for applying a fluid pressure differential on opposite ends of the glass charge to compact the charge therein and form a mouth finish for the parison, closure means for said mold, means operative immediately after the charge is delivered to the mold for applying said closure means to the mold and for maintaining the closure applied to the mold during movement thereof throughout an extent equivalent at least to the spacing between said parison molds, means for blowing the parsion to hollow form while confined in said parison mold by said closure, means for inverting the parison and neck molds to neck end up position, means for opening each parison mold away from the parison during movement thereof, means for moving said parison and a cooperating blow mold toward the transfer point in synchronism and in the same direction and during said movement partially closing said mold around the parison, means for completing transfer of the parison to the blow mold and means for blowing the article to final form in the finishing mold.

68. An organized machine for making hollow glass containers and the like comprising a circular series of parison molds, a circular series of blow molds, laterally spaced rotary supports for moving said parison and blow molds in separate non-axial paths toward and from a transfer point common to both paths, a neck mold for cooperation with each parison mold, mouthforming pin mechanism for each neck mold, means presenting said parison molds in succession in inverted position at a charging position, means for delivering a charge of glass to said mold, means operative simultaneously as the charge enters the mold for applying suction to the glass charge to compact the charge therein and form a mouth finish of the parison, closure means for said mold, means operative immediately after the charge is delivered to the mold for applying said closure means to the mold and for maintaining the closure applied to the mold during movement thereof throughout an extent equivalent at least to the spacing between said parison molds, means for blowing the parison to hollow form while confined in said parison mold by said closure, means for inverting the parison and neck molds to neck end up position, means for opening each parison mold away from the parison during movement thereof, means for moving said parison and a cooperating blow mold toward the transfer point in synchronism and in the same direction and during said movement partially closing said mold around the parison, means for completing transfer of the parison to the blow mold and means for blowing the article to final form in the finishing mold.

69. An organized machine for making hollow glass containers and the like comprising a circular series of parison molds, a circular series of blow molds, laterally spaced rotary supports for moving said parison and blow molds in separate non-axial paths toward and from a transfer point common to both paths, a neck mold for cooperation with each parison mold, mouthforming pin mechanism for each neck mold, means presenting said parison molds in succession in inverted position at a charging position, means for delivering a charge of glass to said mold, means operative simultaneously as the charge enters the mold for applying suction to the glass charge to compact the charge therein and form a mouth finish of the parison, closure means for said mold, means controlled by and operative immediately after the charge is delivered to the mold for applying said closure means to the mold and for maintaining the closure applied to the mold during movement thereof throughout an extent equivalent at least to the spacing between said parison molds, means for blowing the parison to hollow form while confined in said parison mold by said closure, means for inverting the parison and neck molds to neck end up position, means for opening each parison mold away from the parison during movement thereof, means for moving said parison and a cooperating blow mold toward the transfer point in synchronism and in the same direction, and during said movement partially closing said mold around the parison, means for completing transfer of the parison to the blow mold and means for blowing the article to final form in the finishing mold.

70. Organized machinery for making hollow glass containers and the like comprising a charge feeding device, a circular series of parison molds, a circular series of blow molds, laterally spaced rotary supports for moving said parison and blow molds in separate non-axial paths toward and from a transfer point common to both paths, a neck mold for cooperation with each parison mold, mouthforming pin mechanism for each neck mold, means presenting said parison molds in succession in inverted position at a charging position, means for delivering a charge of glass to said mold, closure means for said molds, means automatically controlled by the operation of the charge feeding device after delivery of the charge to the mold for applying the closure means to the upper open end of the mold to confine the glass charge therein, means for maintaining said closure means in charge-confining relation with said mold during movement of said mold and for a definite duration of time required for the mold to be moved a distance at least equal to the spacing between said molds, means for admitting air under pressure to the opposite ends of the confined charges, first to campact the charge around the mouthforming pin and thereafter to blow the charge to hollow form to form the parison, adjustable controls for the blowing air to vary the duration of the compacting and parison blowing throughout the charge confining period, means to revert the mold to neck up position, means to release the parison mold from the parison, means for moving said parison and a cooperating blow mold toward the transfer point in synchronism and in the same direction and during said movement partially closing said mold around the parison, means for completing transfer of the parison to the blow mold and means for blowing the article to final form in the finishing mold.

71. An organized machine for making hollow glass containers comprising laterally spaced non-axial mold carriers, blank and finishing molds mounted on respective carriers, means for rotating said carriers to move said molds in non-axial intersecting paths approaching the point of intersection in the same direction, means for partially closing the finishing mold around the exposed parison as said mold and parison simultaneously approach a transfer position, neck molds for cooperative association with the parison molds, a revoluble mounting for the parison and neck molds whereby the parison molds may be successively presented at a charging station in inverted position and at the transfer position at said intersecting point in upright position, connections extending axially through the revoluble mounting for opening and closing said parison molds, cam means for operating said connections, said connections having means for operative engagement with said cam means for effecting actuation of said parison molds during opposite vertical positions thereof, and means for shaping the parison in the parison mold during movement thereof including a closure member for the mold, adapted to confine the glass charge in said mold at least until after the next succeeding parison mold has received its charge, and means to blow the glass to hollow form while confined in the parison mold to form the parison, means to transfer the formed parison to the finishing mold and means to blow the parison to final form in the finishing mold.

72. The method of forming hollow glass containers which consists in delivering charges of glass in succession to a series of inverted parison molds having neck molds associated therewith, applying suction simultaneously axially of the neck mold and laterally throughout a substantial portion of the parison mold to compact the glass charge in the parison and neck mold and around a mouthforming pin to form the neck and mouth finish of the article, removing the mouthforming pin and confining the charge in the parison mold, thereafter applying air under pressure exclusively to the neck end of the packed charge to counterblow the charge in the parison mold to form a hollow glass parison of definite length and shape and while a succeeding charge is being compacted in a parison mold, inverting the parison in the parison mold, disengaging the parison mold from the hollow parison to expose the parison supported by its neck, simultaneously and synchronously moving the exposed parison and an open finishing mold in converging paths toward a transfer position and during such movement progressively closing the finishing mold around the exposed moving parison, supporting the parison within but out of contact with the walls of the finishing mold for a period of time during which a succeeding parison is transferred to its finishing mold to permit the skin of the parison to reheat to proper blowing temperature, and then blowing the parison to final form in the finishing mold.

73. The method as defined in claim 72 characterized by further packing the glass charge in the parison mold by air under pressure applied to the upper end of the charge immediately after the charge is delivered to said mold.

74. The method as defined in claim 72 characterized by further packing the glass charge in the parison mold by air under pressure applied to the upper end of the charge immediately after the charge is delivered to said mold, and variably controlling the duration of the application of such compacting pressure air.

75. The method defined in claim 72 further characterized by variably controlling the commencement and duration of the parison expanding blowing air.

76. The method defined by claim 72 further characterized by variably controlling the period of reheating for each parison independently of the other and independently of the speed of the machine in accordance with the type of ware being made.

77. The method as defined in claim 72 characterized by variably controlling the commencement of final blowing air for each parison independently of the other and independently of the speed of the machine.

78. The method of forming hollow glass containers which consists in moving a series of cooperating inverted parison molds and neck molds in succession to a charging position and momentarily halting said molds at such position for a less time than the preceding moving period, so that said halted parison mold may receive a charge of glass from above, delivering a charge of glass from above into a stationary mold, applying air pressure differential to the opposite ends of the parison and neck mold as the charge of glass is delivered thereto to cause said glass to be initially forced into the neck mold cavity around a mouth forming pin, closing the upper end of the mold and moving said mold away from the charging position, admitting air under pressure axially of the neck end of the charge to expand the same in the closed moving parison mold and for a period of time greater than the time the parison mold was halted at the charging position so as to form a hollow parison of definite length and shape, inverting the parison and neck molds to neck end up position, disengaging the parison mold from the parison during movement thereof to expose the parison supported by its neck end, simultaneously and synchronously moving the exposed parison and an open finishing mold in converging paths toward a transfer point and during such movement progressively closing the finishing mold about the exposed parison, momentarily halting the parison and the finishing mold to finally close the finishing mold around the parison and disengage the parison supporting means therefrom, confining the parison in the closed finishing mold but out of contact with the walls thereof for a period of time during which a succeeding parison is transferred to the finishing mold to permit the skin of the parison to reheat to suitable blowing temperature and thereafter blowing the parison to final form in the finishing mold.

79. The method defined in claim 78 further characterized by applying suction in the parison and neck molds as they are halted at the charging position to initially settle the glass charge therein.

80. The method defined in claim 78 further characterized by applying suction in the parison and neck molds as they are halted at the charging position to initially settle the glass charge therein, and thereafter applying air under pressure to the upper end of the glass charge to pack said charge in the parison and neck mold and form the mouth finish of the article.

81. The method defined in claim 78 further characterized by applying suction in the parison and neck molds as they are halted at the charging position to initially settle the glass charge therein, and thereafter applying air under pressure to the upper end of the glass charge to pack said charge in the parison and neck mold and form the mouth finish of the article and variably controlling the duration of said compacting pressure air.

82. The method defined in claim 78 further characterized by continuing the application of air under pressure to the neck end of the parison to maintain the parison expanded in the parison mold while a next succeeding charge of glass is delivered and initially settled in the succeeding parison mold.

83. The method defined by claim 78 further characterized by concluding the inverting of the parison and neck mold to precise vertical disposed neck end up position, simultaneously with the halting of a succeeding mold at the charging position and then locking said mold in such vertical neck end up position.

84. The method defined in claim 78 further characterized by variably controlling the period of reheating for each parison independently of the other and independently of the speed of the machine.

85. The method defined by claim 78 further characterized by variably controlling the commencement and duration of final blowing of the parison to final form in the finishing mold.

86. The method defined by claim 78 further characterized by variably controlling the termination of final blowing of the parison to final form in the finishing mold.

87. The method defined by claim 78 further characterized by continuing the final blowing of a parison in the finishing mold until a succeeding charge of glass is delivered to and compacted in the parison mold in which said finished blown parison was formed.

88. The method defined by claim 78 further characterized by variably controlling the volume and pressure of final blowing air initially admitted to the parison.

89. The method defined by claim 78 further characterized by bringing the parison molds to said charging position in quick succession and successively and momentarily halting the molds at such position for a brief period of time sufficient to permit the charging of the mold and the final closing of the blow mold and a preceding parison at the transfer position, but insufficient for the counter-blowing or reheating of the parison.

90. The method defined by claim 78 further characterized by bringing the parison molds to said charging position in quick succession and successively and momentarily halting the molds at such position for a variably controlled period of time sufficient to permit the charging of the mold and the final closing of the blow mold and a preceding parison at the transfer position, but insufficient for the counter-blowing or reheating of the parison.

EDWARD G. BRIDGES.